United States Patent [19]
Kielma

[11] Patent Number: 4,558,506
[45] Date of Patent: Dec. 17, 1985

[54] NUMERICALLY CONTROLLED AUTOMATIC TOOL CHANGING MACHINING CENTER HAVING A BAR-TYPE SPINDLE

[75] Inventor: Ervin J. Kielma, West Allis, Wis.

[73] Assignee: Kearney & Trecker Corporation, West Allis, Wis.

[21] Appl. No.: 319,781

[22] Filed: Nov. 9, 1981

[51] Int. Cl.[4] ............................................. B23Q 3/157
[52] U.S. Cl. ...................................... 29/568; 27/33 D; 414/736; 414/753; 901/16
[58] Field of Search ....................... 29/568, 33 D, 563; 409/233, 234; 414/736, 749, 753; 901/16

[56] References Cited

U.S. PATENT DOCUMENTS

| | | |
|---|---|---|
| 3,099,873 | 8/1963 | Brainard et al. ................... 29/568 X |
| 3,273,235 | 9/1966 | Dziedzic et al. ....................... 29/568 |
| 3,300,856 | 1/1967 | Daugherty ............................. 29/568 |
| 3,312,370 | 4/1967 | Kolarich et al. ....................... 221/13 |
| 3,458,924 | 8/1969 | Oslebo et al. ........................... 29/568 |
| 3,546,774 | 12/1970 | Stöferle et al. ......................... 29/568 |
| 3,591,920 | 7/1971 | Brainard et al. ...................... 29/568 |
| 3,820,234 | 6/1974 | Poincenot ............................... 29/568 |
| 3,868,886 | 3/1975 | Bonolie ............................... 409/233 |
| 3,930,301 | 1/1976 | Wagner ................................. 29/568 |
| 4,156,962 | 6/1979 | Haller et al. ........................... 29/568 |
| 4,190,947 | 3/1980 | Sato et al. .............................. 29/568 |
| 4,240,194 | 12/1980 | Inami et al. ............................ 29/568 |
| 4,344,221 | 8/1982 | Pagani ................................... 29/568 |

FOREIGN PATENT DOCUMENTS

| | | |
|---|---|---|
| 3009357 | 10/1981 | Fed. Rep. of Germany ........ 29/568 |
| 0119347 | 9/1981 | Japan ..................................... 29/568 |

*Primary Examiner*—Z. R. Bilinsky
*Attorney, Agent, or Firm*—Quarles & Brady

[57] ABSTRACT

A numerically controlled automatic tool changing machining center is provided with a rotary driven spindle concentric within which is a spindle bar that may be reciprocated out from or into the spindle by a hydraulic cylinder. Located at the forward end of the spindle bar is a tool receiving socket which is operative to releaseably engage the shank of a single toolholder or multiple spindle toolhead transferred to the spindle bar from the machine tool storage magazine by a tool transfer arm. When a large, single toolholder is engaged by the spindle bar, the spindle bar is retracted into the spindle to urge the large single toolholder against the nose of the spindle. In the case of a multiple spindle toolhead being engaged by the spindle bar, the spindle bar is retracted into the spindle to urge the multiple spindle toolhead against the spindlehead so that locating pins extending rearwardly from the multiple spindle toolhead body seat in complementary locating cones spaced about the spindle on spindlehead to secure the multiple spindle toolhead body against rotation.

2 Claims, 29 Drawing Figures

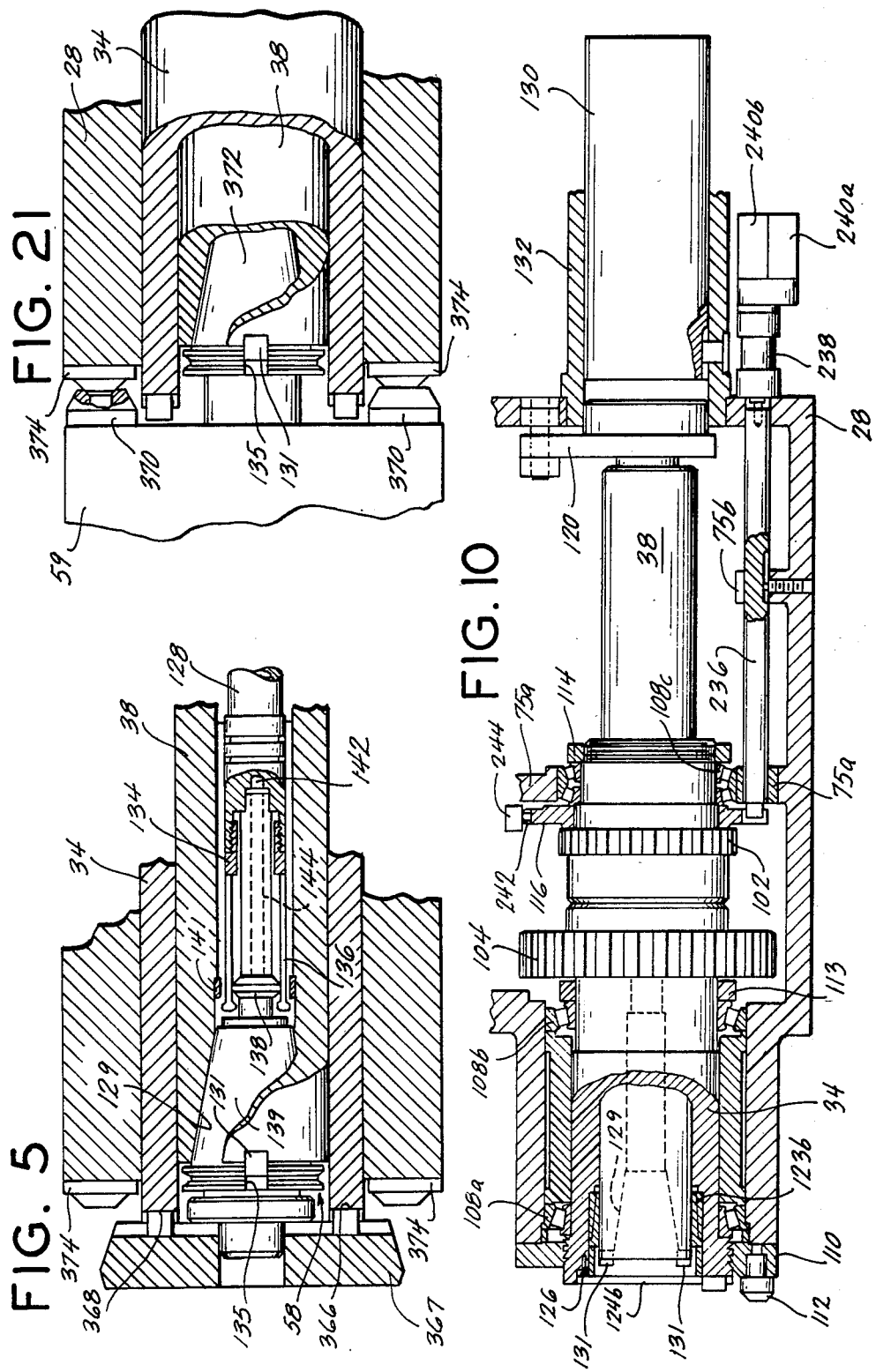

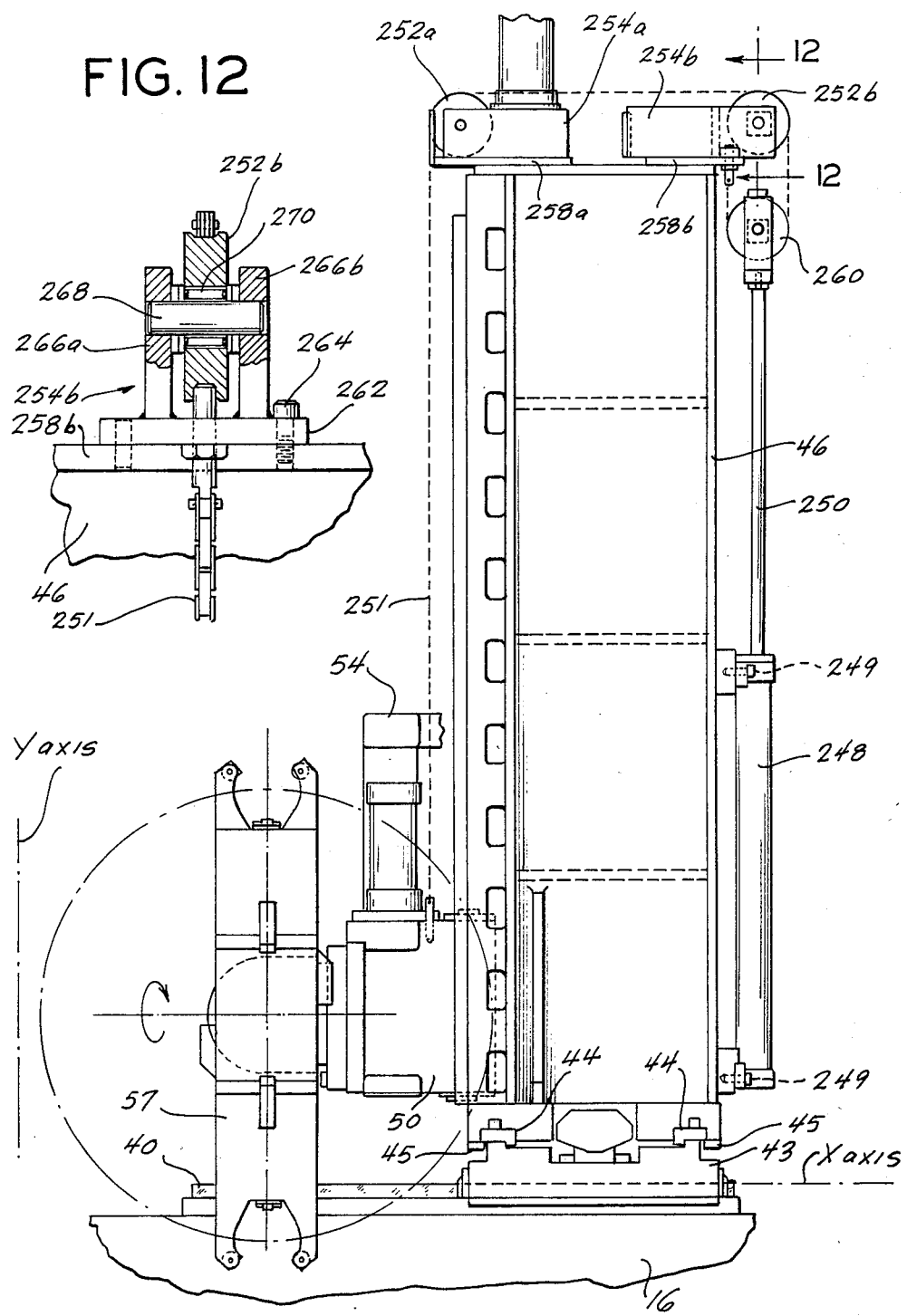

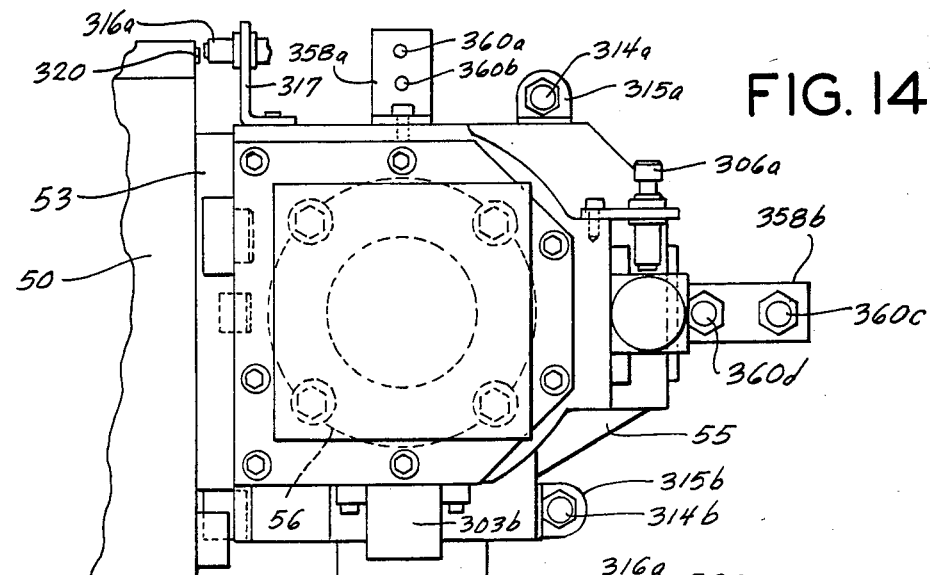
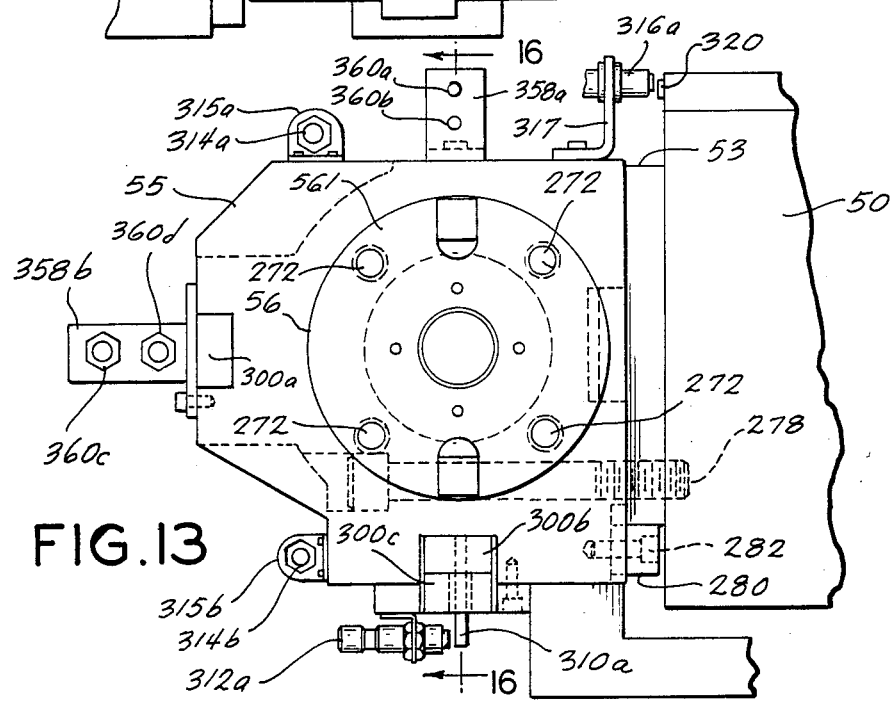

FIG. 18
FIG. 17
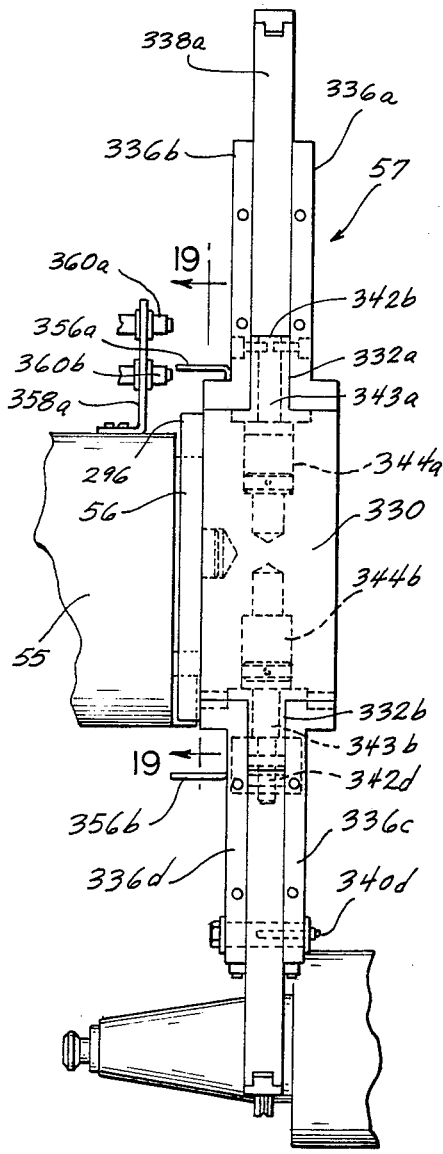
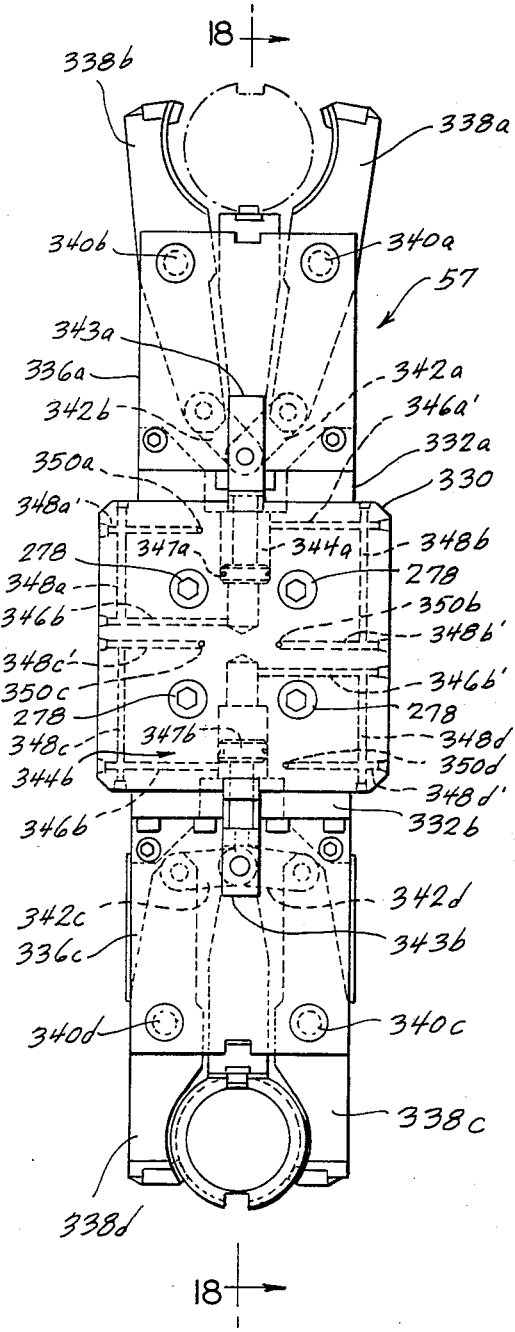

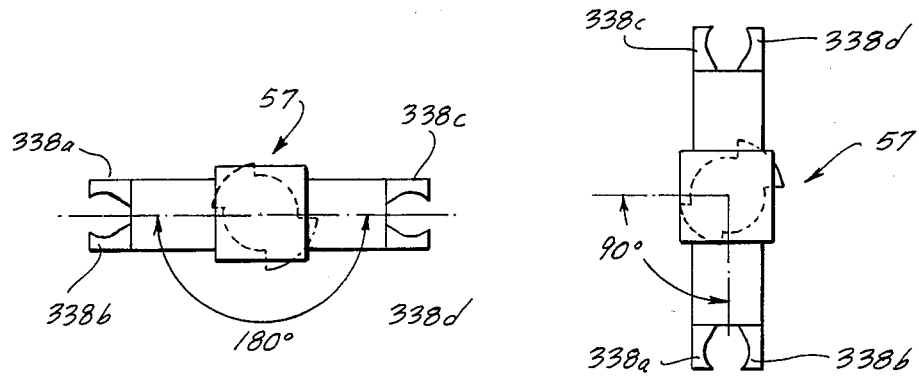
FIG. 20 C
FIG. 20 D
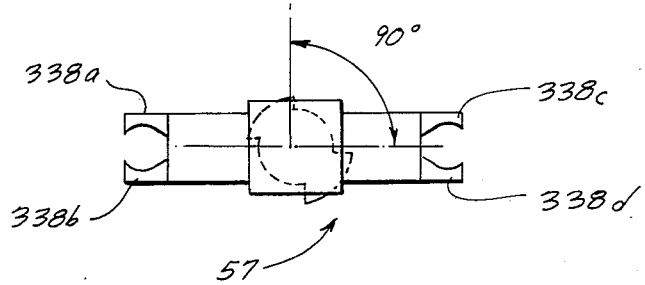
FIG. 20 E
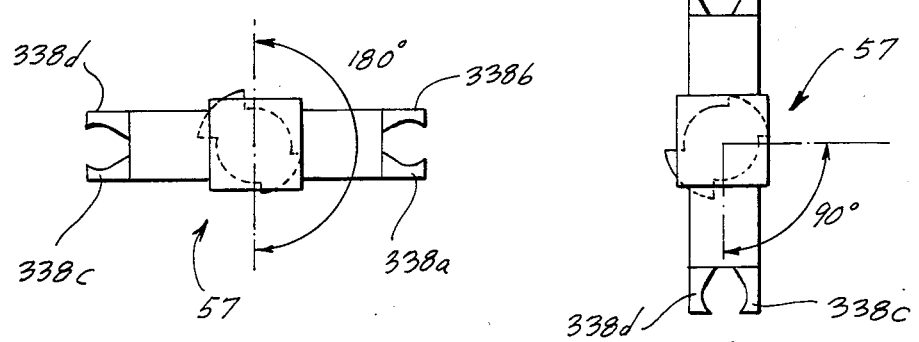
FIG. 20 F
FIG. 20 G

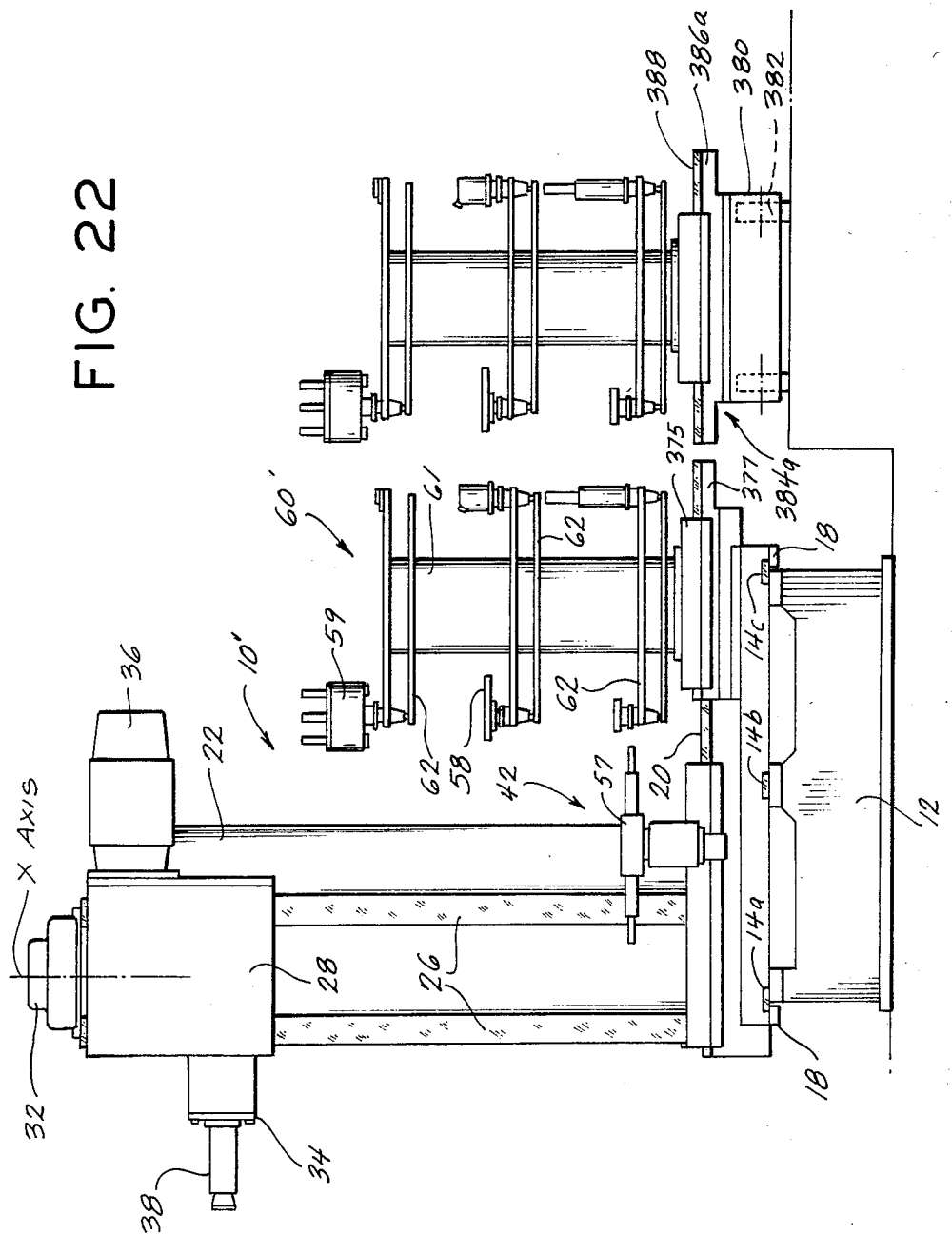

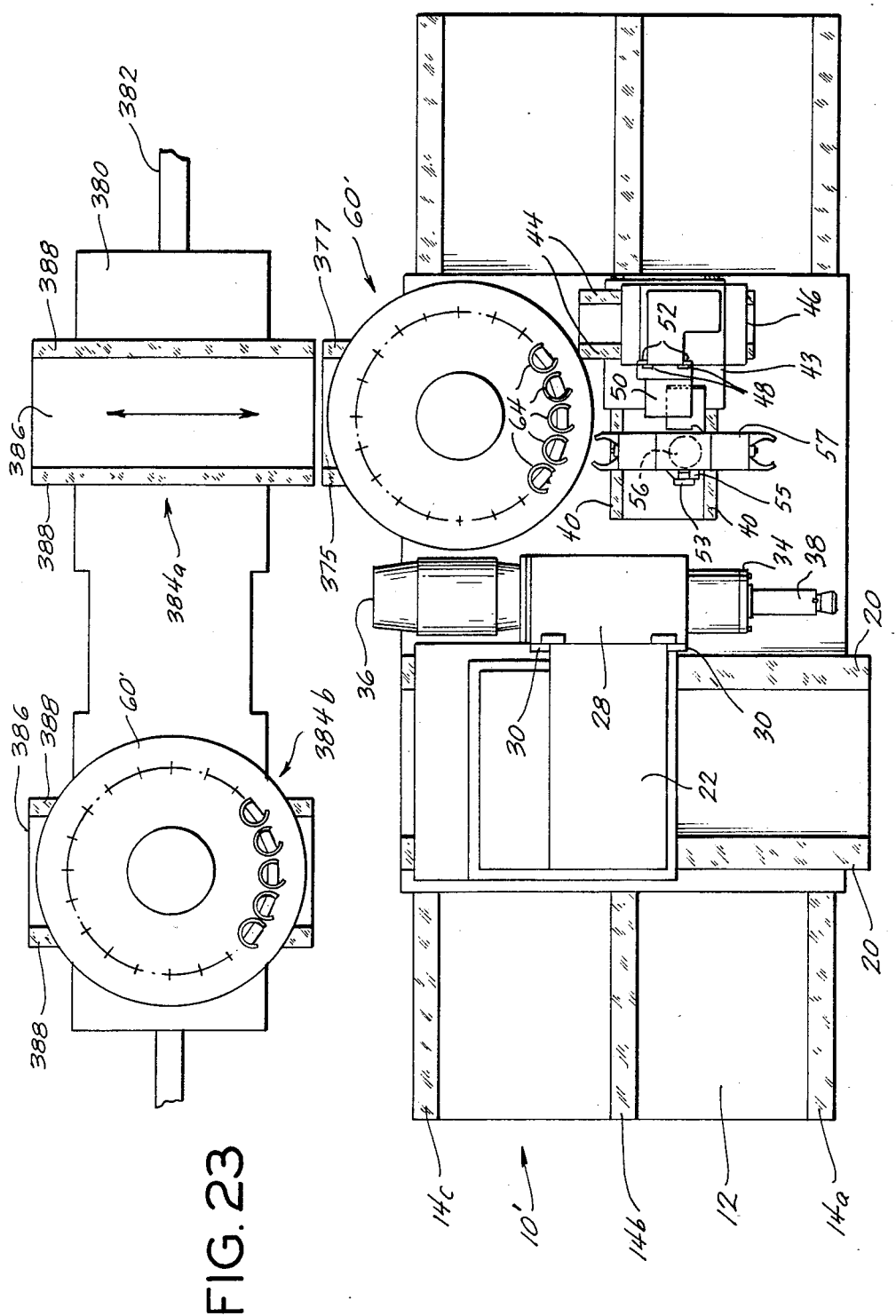

NUMERICALLY CONTROLLED AUTOMATIC TOOL CHANGING MACHINING CENTER HAVING A BAR-TYPE SPINDLE

BACKGROUND OF THE INVENTION

This invention relates generally to numerically controlled machine tools having an automatic tool changer thereon and, more specifically, to a numerically controlled automatic tool changing machining center having a bar-type spindle.

In the past, machine tools have been constructed with automatic tool changers capable of accommodating either single shank toolholders or large multiple spindle toolheads weighing as much as 500 kgs. (1,000 lbs.) but not both. Machine tools having automatic tool changers thereon capable of exchanging single shank toolholders are usually fabricated with the tool storage magazine mounted on either the machine tool column or on the machine tool spindlehead. Such an arrangement precludes accommodation of large multiple spindle toolheads since the storage of one or more heavy multiple spindle toolheads in a spindlehead-mounted or column-mounted tool storage magazine will likely place an undue strain on the upright, tending to adversely affect machine tool accuracy. On the other hand, machine tool automatic tool changers which are designed to exchange large multiple spindle toolheads are typically unable, because of the large size and bulk of the tool changer mechanism, to accommodate smaller single shank toolholders.

In an attempt to overcome this difficulty, the machine tool and automatic tool changer therefore described and claimed in U.S. Pat. No. 4,288,909 issued on Sept. 15, 1981 was invented. The automatic tool changer described and claimed in this patent comprises a tool storage magazine, which, together with the machine tool upright, is mounted on a saddle that is slidably mounted on the machine tool bed so that the upright and machine tool column move in unison. The upright slidably supports a spindlehead in which is rotatably journaled a spindle for carrying a selected one of the multiple spindle toolheads and single toolholders which are vertically stored in the tool storage magazine. To accomplish a tool exchange, a toolholder or multiple spindle toolhead stored in the tool storage magazine is transferred from the tool storage magazine by a first tool gripper to a tilt unit which tilts the tool 90° to enable a double ended tool changer arm mounted on the saddle to exchange the tool held in the tilt unit with the tool then engaged in the spindle. A multiple spindle toolhead transferred from the tool storage magazine to the spindle in this manner is secured to the spindlehead by a breach lock mechanism comprised of a plurality of threaded studs each extending rearwardly from the toolhead into a complementary threaded collar in the machine tool spindlehead adjacent to the spindle. Each threaded collar is rotatably driven by a ball screw to engage its complementary stud on the toolhead so as to urge the toolhead against the spindle.

While the above-described machine tool is capable of accommodating both single toolholders and multiple spindle toolheads, thus overcoming the disadvantages of the aforementioned prior art automatic tool changers, the previously invented automatic tool changer necessitates a relatively complicated breach lock arrangement for securing multiple spindle toolheads against the machine tool to prevent rotation of the toolhead body when the toolhead input shank is driven by the spindle. In contrast, my present invention concerns an automatic tool changing machining center whose spindle has a bar concentric therein for extension from the spindle to engage a toolholder or multiple spindle toolhead. The bar is retractable into the spindle for urging a large single toolholder, when so engaged by the spindle bar, against the spindle nose and for urging a multiple spindle toolhead, when so engaged by the spindle bar against the machine tool so that locating pins extending rearwardly from the multiple spindle toolhead body engage complementary locating cones secured on the machine tool thereby securing the multiple spindle toolhead body against rotation.

BRIEF SUMMARY OF THE INVENTION

Briefly, in accordance with the preferred embodiment of the invention, an improved numerically controlled machining center and automatic tool changer therefor comprises a bed on which a saddle is slidably mounted for movement on the bed along a first path. The saddle slidably supports a column or upright which is movable on the saddle along a path perpendicular to the path of saddle movement on the bed. In addition, the saddle also slidably supports an automatic tool changer so that the automatic tool changer and upright move in unison with the saddle. On the upright there is slidably mounted the spindlehead which moves vertically on the upright along a path perpendicular to both the path of saddle movement on the bed and upright movement on the saddle. Rotatably journaled into the spindlehead is a rotary-driven cutting tool-carrying spindle concentric within which is a spindle bar which rotates co-jointly with the spindle. Means are provided, in the form of a hydraulic cylinder, for urging the spindle bar outwardly to enable a tool gripper located at the end of the spindle bar distal from the spindlehead to engage either a single toolholder or multiple spindle toolhead transferred thereto from the tool storage magazine by the tool changer. After a large single toolholder is engaged by the spindle bar tool gripper, the spindle bar is retracted in the spindle to urge the large single toolholder against the spindle nose to provide additional support for the toolholder. Following extension of the spindle bar to engage a multiple spindle toolhead, the spindle bar is retracted into the spindle to urge the multiple spindle toolhead against the machine tool so that locating pins extending rearwardly from the toolhead engage complementary locating cones on the machine tool, respectively. In this way, the multiple spindle toolhead body is prevented from rotating. The automatic tool changer of the present invention comprises a tool storage magazine carried by the saddle for vertically storing the single toolholders and multiple spindle toolheads and includes a tool transfer mechanism having a double ended tool transfer arm movable along the saddle and pivotal about a pair of mutually perpendicular paths for transferring toolholders and multiple spindle toolheads between the spindle bar and the tool storage magazine. The tool storage magazine can be fixedly mounted on the saddle or, can be removably secured on the saddle so as to advantageously permit exchange of an entire tool storage magazine, thereby tremendously increasing machine tool flexibility.

BRIEF DESCRIPTION OF THE DRAWINGS

The features of this invention, believed to be novel are set forth in the appended claims. The invention itself, both as to organization and method of operation together with further objects and advantages thereof, may best be understood by reference to the drawings in which:

FIG. 5 is an enlarged sectional view of the spindle bar tool gripping mechanism comprising a portion of the automatic tool changing machining center depicted in FIG. 4;

FIG. 10 is a sectional view of the spindle keylock mechanism of the automatic tool changing machining center taken along lines 10—10 of FIG. 6;

FIG. 11 is an enlarged frontal view of the automatic tool changing machining center of FIG. 1;

FIG. 12 is a cross sectional view of one of a chain supporting sheaves of FIG. 11 taken along lines 12—12 thereof;

FIG. 13 is an enlarged frontal view of a portion of the tool transfer arm carrier of the automatic tool changing machining center of the present invention;

FIG. 14 is an enlarged rearward view of a portion of the tool transfer arm carrier of the automatic tool changing machining center of the present invention;

FIG. 17 is an enlarged frontal view of the tool transfer arm comprising a portion of the tool transfer mechanism;

FIG. 18 is a cross sectional view of the tool transfer arm of FIG. 17 taken along lines 18—18 thereof;

FIG. 20a through 20g illustrate, in sequential fashion, the position of the tool transfer arm during each respective step of a tool change cycle;

FIG. 21 is an enlarged cross sectional view taken along lines 21—21 of FIG. 2 illustrating how a multiple spindle toolhead seats itself against a machine tool when the spindle bar engaging the multiple spindle toolhead is retracted into the spindle;

FIG. 22 is a frontal view of an alternate embodiment of the automatic tool changing machining center of the invention; and FIG. 23 is a top or plan view of the automatic tool changing machining center of FIG. 22.

DETAILED DESCRIPTION OF THE PREFERRED EMBODIMENT

Figure 1:
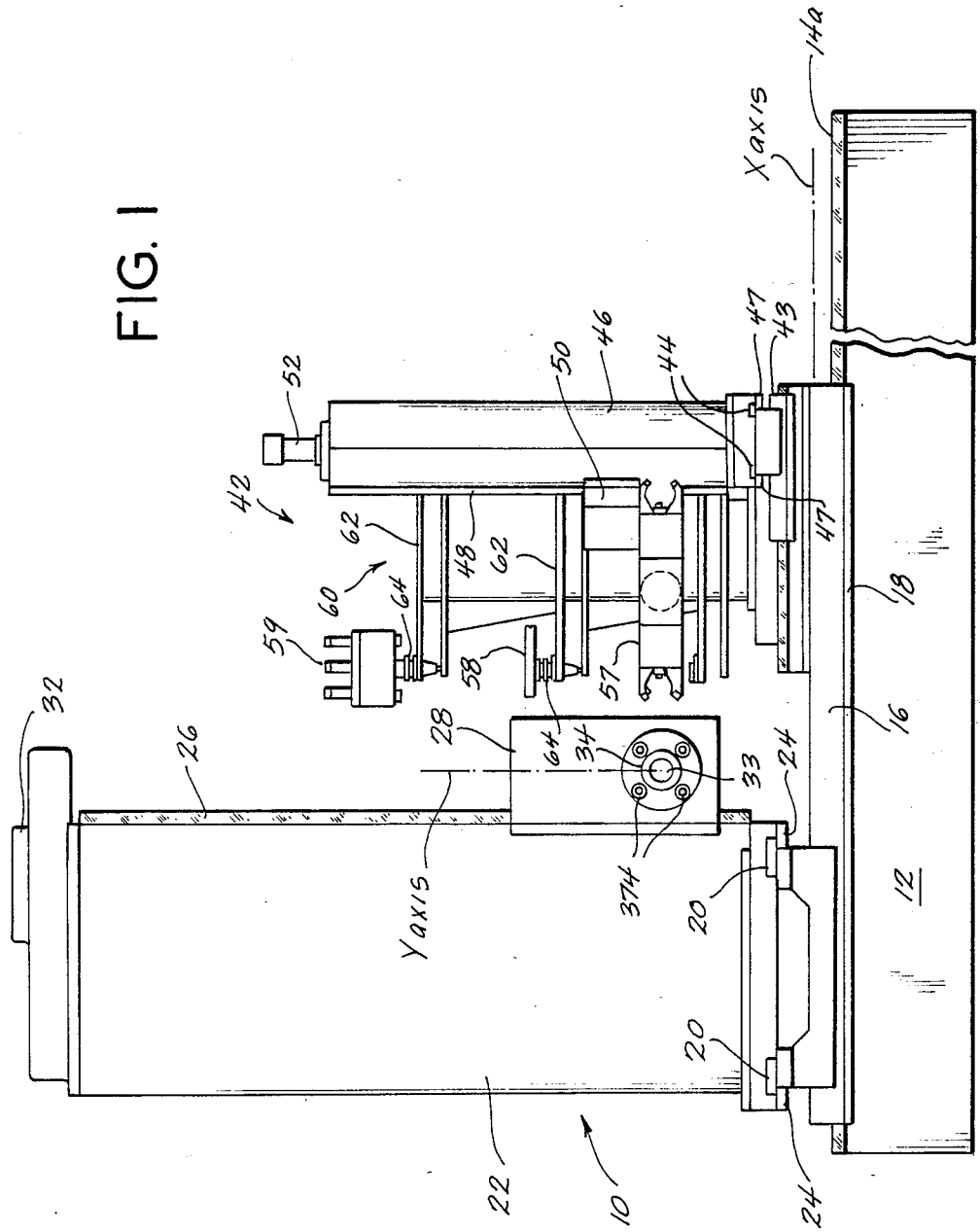
FIG. 1 is a frontal view of the automatic tool changing machining center of the present invention.
Figure 2:
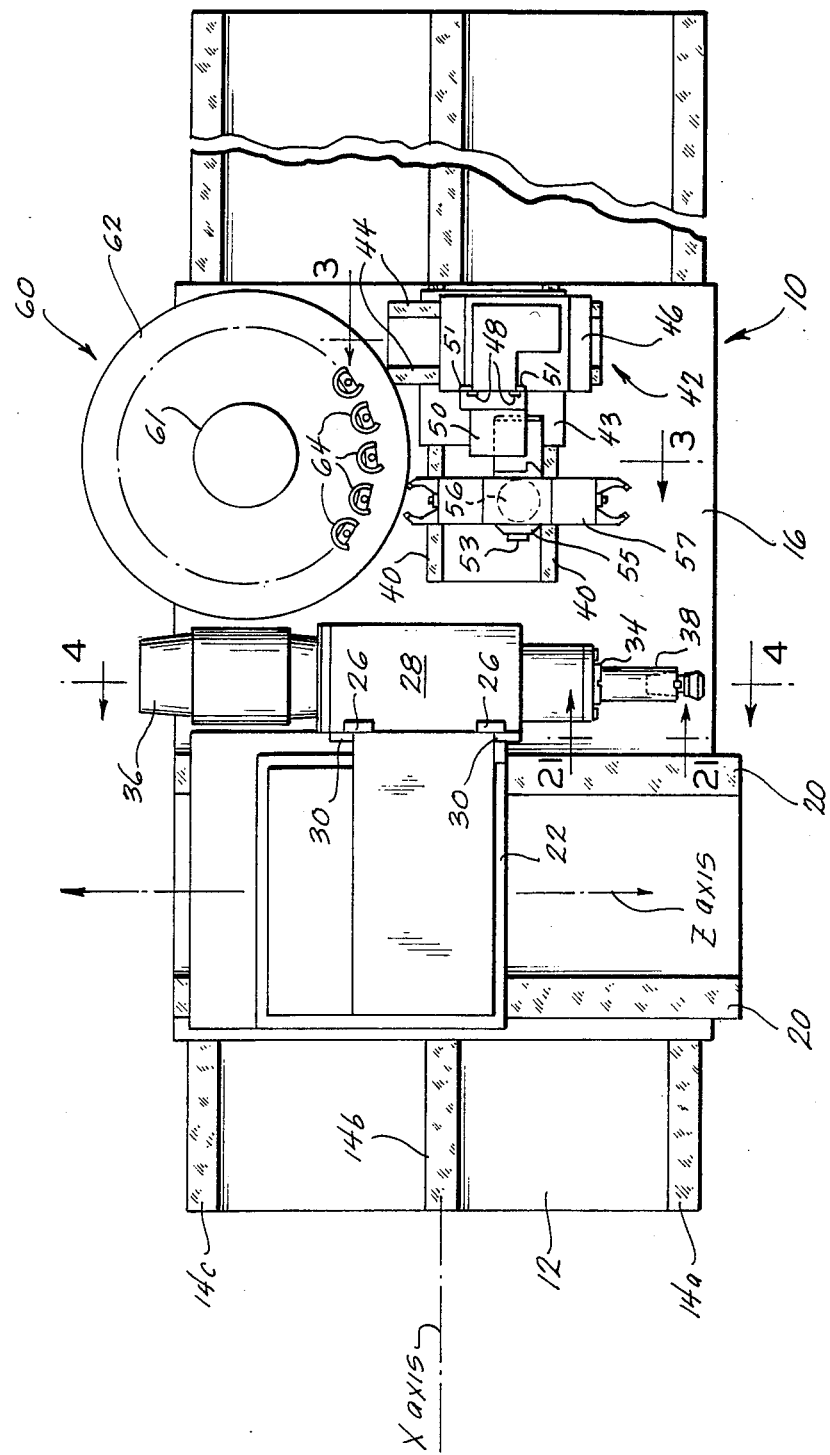
FIG. 2 is a top or plan view of the automatic tool changing machining center in FIG. 1.
Figure 3:
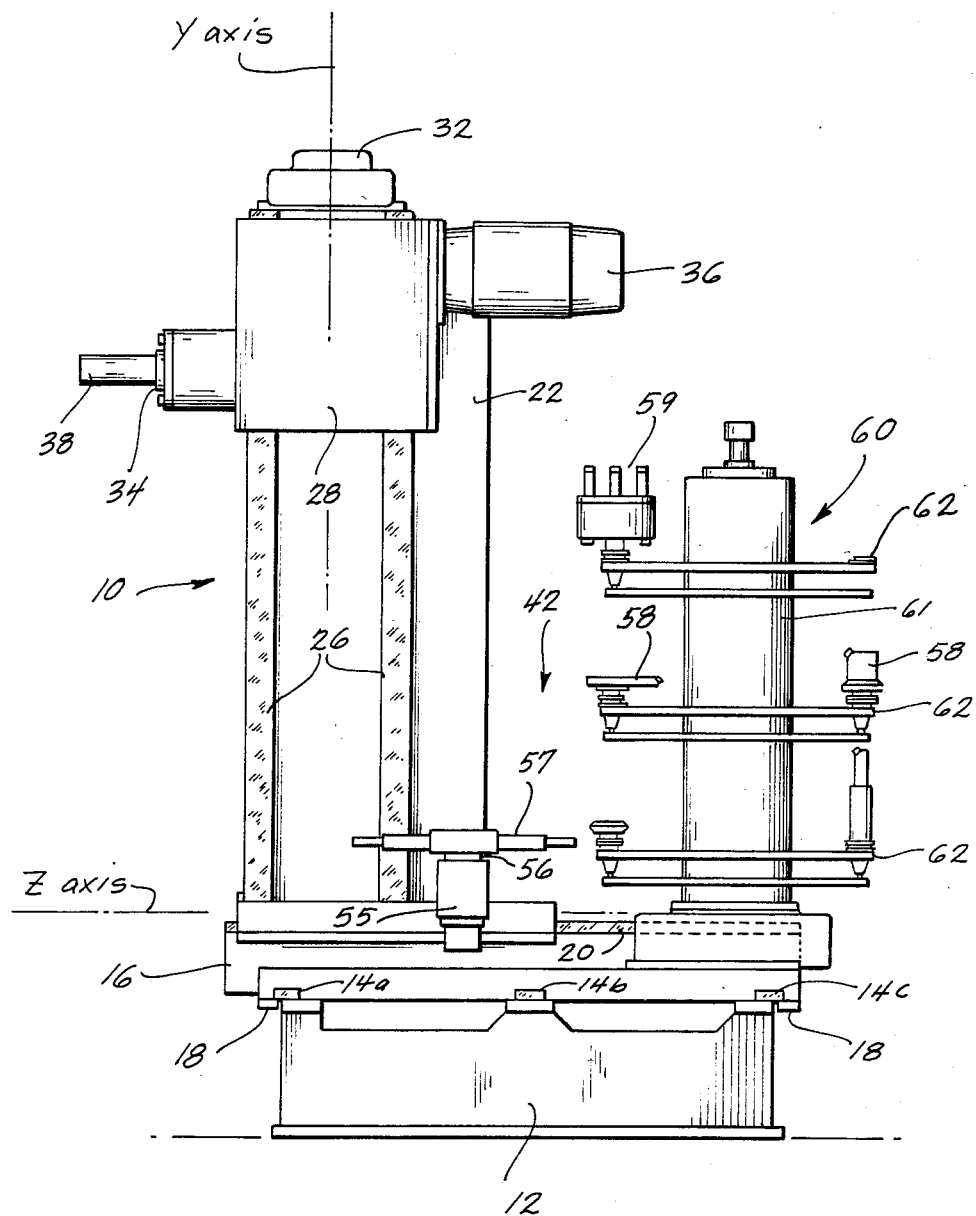
FIG. 3 is an end view of the automatic tool changing machining center of FIG. 2 taken along lines 3—3 thereof.

FIGS. 1, 2 and 3 illustrate in elevation, the front, plan and side views, respectively, of an improved machining center 10 having an automatic tool changer thereon. Machining center 10 comprises a bed 12 having three ways 14a, 14b and 14c (FIGS. 2 and 3) fastened thereon in spaced apart parallelism. A saddle 16 is slidably mounted on the ways by gibs 18 (FIG. 3) for movement on bed 12 along the ways parallel to a first path hereinafter designated as the X axis (FIGS. 1 and 2). Conventional means (not shown), typically taking the form of a ball nut fastened to the underside of the saddle, a ball screw rotatably journaled in the bed so as to be in threaded engagement with the ball nut and a servo motor for rotatably driving the ball screw under command of the machine tool control system (not shown), are provided for precisely positioning saddle 16 on bed 12 along the X axis. Saddle 16 has a pair of parallel, spaced apart ways 20 (FIGS. 1 and 2) fastened thereon so as to be perpendicular to each of ways 14a, 14b and 14c on bed 12. A column or upright 22 is slidably mounted on ways 20 by gibs 24 (FIG. 1) for movement on the ways across the saddle along a second path hereinafter designated as the Z axis (FIGS. 2 and 3) the Z axis being perpendicular to the X axis. Conventional means (not shown) typically taking the form of a ball nut fastened to the underside of upright 22, a ball screw journaled in the saddle in threaded engagement with the ball nut and a servo motor under command of the machine tool control system for rotatably driving the ball screw, are provided for precisely positioning the upright 22 along the Z axis.

Fastened to the side of column 22 is a pair of parallel spaced apart ways 26 (FIGS. 2 and 3) which extend vertically on the upright along a third path hereinafter designated as the Y axis (FIGS. 1 and 3) which is mutually perpendicular to each of the X and Z axes. Ways 26 slidably support a spindlehead 28 which is secured to the ways by gibs 30 (FIG. 2) for movement on the ways along the Y axis. Conventional means, taking the form of a ball nut (not shown) fastened to the spindlehead, a ball screw rotatably journaled in the upright for threaded engagement with the ball nut and a servo motor 32 (FIGS. 1 and 3) for rotatably driving the ball nut under command of the machine tool control system, are provided for precisely positioning spindlehead 28 along ways 26.

Spindlehead 28 has a cutting tool carrying spindle 34 horizontally journaled in the front face thereof for rotation about axis parallel to the Z axis (FIGS. 2 and 3). Spindle 34 is rotatably driven through a gear train within the spindlehead (described in greater detail with respect to FIG. 4) from a spindle drive motor 36 (FIGS. 2 and 3) attached to the rearward end of the spindlehead. Concentric within spindle 34 is a spindle bar 38 which rotates co-jointly with the spindle when the spindle is driven by spindle drive motor 36. As will be seen in greater detail hereinafter, spindle bar 38 is laterally movable relative to the spindle along their common axis so as to enable the spindle bar to be extended forwardly from the spindle to engage a single toolholder or multiple spindle toolhead and to be retracted into the spindle to urge a toolholder, when engaged by the spindle bar, against the spindle nose and to urge a multiple spindle toolhead, when so engaged by the spindle bar, against the machine tool spindlehead.

Saddle 16, in addition to supporting ways 20, also supports a second set of ways 40 (FIG. 2) which are secured thereon so as to be in spaced apart parallelism with each other, with each of ways 40 being perpendicular to each of ways 20. Ways 40 slidably support an automatic tool changer 42, which, in the presently preferred embodiment, comprises a platform 43 (FIGS. 1 and 2) slidably supported on ways 40 for movement thereon to and from spindlehead 28 along a path parallel to the X axis. Conventional means (not shown), typically taking the form of a hydraulic cylinder, is coupled between platform 43 and saddle 16 and is pressurized, responsive to commands from the machine tool control system, to displace platform 43 along ways 40. Platform 43 has a pair of parallel spaced apart ways 44 (FIG. 2) fastened thereon with each of ways 44 being perpendicular to ways 40 on saddle 16. Ways 44 slidably support a tool change tower 46 (FIGS. 1 and 2) which is fastened to the ways by roller gibs 47 (FIG. 1). Conventional means (not shown), typically taking the form of a hydraulic cylinder, is fastened between tower 46 and platform 43 and, when pressurized in response to commands of the machine tool control system, displaces tower 46 along ways 44 on platform 43 between a forward and rearward position on saddle 16.

Tower 46 has a pair of parallel spaced apart ways 48 (FIGS. 1 and 2) secured to the side of the tower facing upright 22. A tool changer arm carrier 50 is slidably secured to ways 48 by roller gibs 51 (FIG. 2) so as to be movable therealong. Conventional means in the form of a ball nut (not shown) fastened to the side of the tool change arm carrier adjacent to tower 46, a ball screw (not shown) rotatably journaled in tower 46 in threaded engagement with the ball nut, and a servo motor 52 secured to the top of the tower for rotatably driving the ball screw under command of the machine tool control system, are provided for positioning the tool change arm carrier along the tower. A counterbalancing mechanism (described in greater detail with respect to FIGS. 11 and 12) counterbalances the tool transfer arm carrier as it moves along ways 48 on tower 46.

Tool transfer arm carrier 50 has a pivot 53 (FIG. 2) journaled therein for rotation about an axis parallel to the X axis. Conventional means taking the form of a rotary hydraulic actuator 54 (illustrated in FIG. 11) are provided for rotating pivot 53 about its axis under command of the machine tool control system. A housing 55 (FIG. 2) is secured to pivot 53 so as to rotate co-jointly therewith about an axis parallel to the X axis. Housing 55 has a pivot 56 journaled therein for rotation about an axis perpendicular to the axis of housing 55 rotation. Pivot 56 is rotated under command of the machine tool control system by conventional means, typically taking the form of a rotary hydraulic actuator described in greater detail hereinafter.

A double ended tool change arm 57 (described in detail with respect to FIGS. 17 and 18) is secured to pivot 56 for co-joint rotation therewith. Tool change arm 57 has a tool gripper at each end thereof, each of the tool grippers being operative to engage the shank of a single toolholder 58 (FIG. 1) or a multiple spindle toolhead 59 (FIG. 1) which are stored in a tool storage magazine 60 secured to saddle 16. In the presently preferred embodiment, tool storage magazine 60 includes a vertically extending shaft 61 which is rotatably journaled in saddle 16 for rotation about an axis parallel to the Y axis (FIG. 1). At least one tool storage disk 62 is coaxially secured to shaft 61 for co-joint rotation therewith. Preferably, three tool storage disks 62 are coaxially secured to shaft 61 in parallel spaced apart relationship as illustrated in FIGS. 1 and 3. Each tool storage disk has a plurality of vertically disposed tool receiving sockets 64 (FIG. 2) therein, the tool receiving sockets being disposed within the disk adjacent to the periphery thereof for vertically storing single toolholders and multiple spindle toolheads. Means (not shown) typically taking the form of a well known servo drive motor, are provided for precisely rotating shaft 61 about its axis in accordance with commands from the machine tool control system to locate one of tool receiving sockets 64 of each of tool storage disks 62 in a ready position opposite to the tool change arm to enable transfer of the tool to the spindle bar by tool change arm 57.

Figure 4:
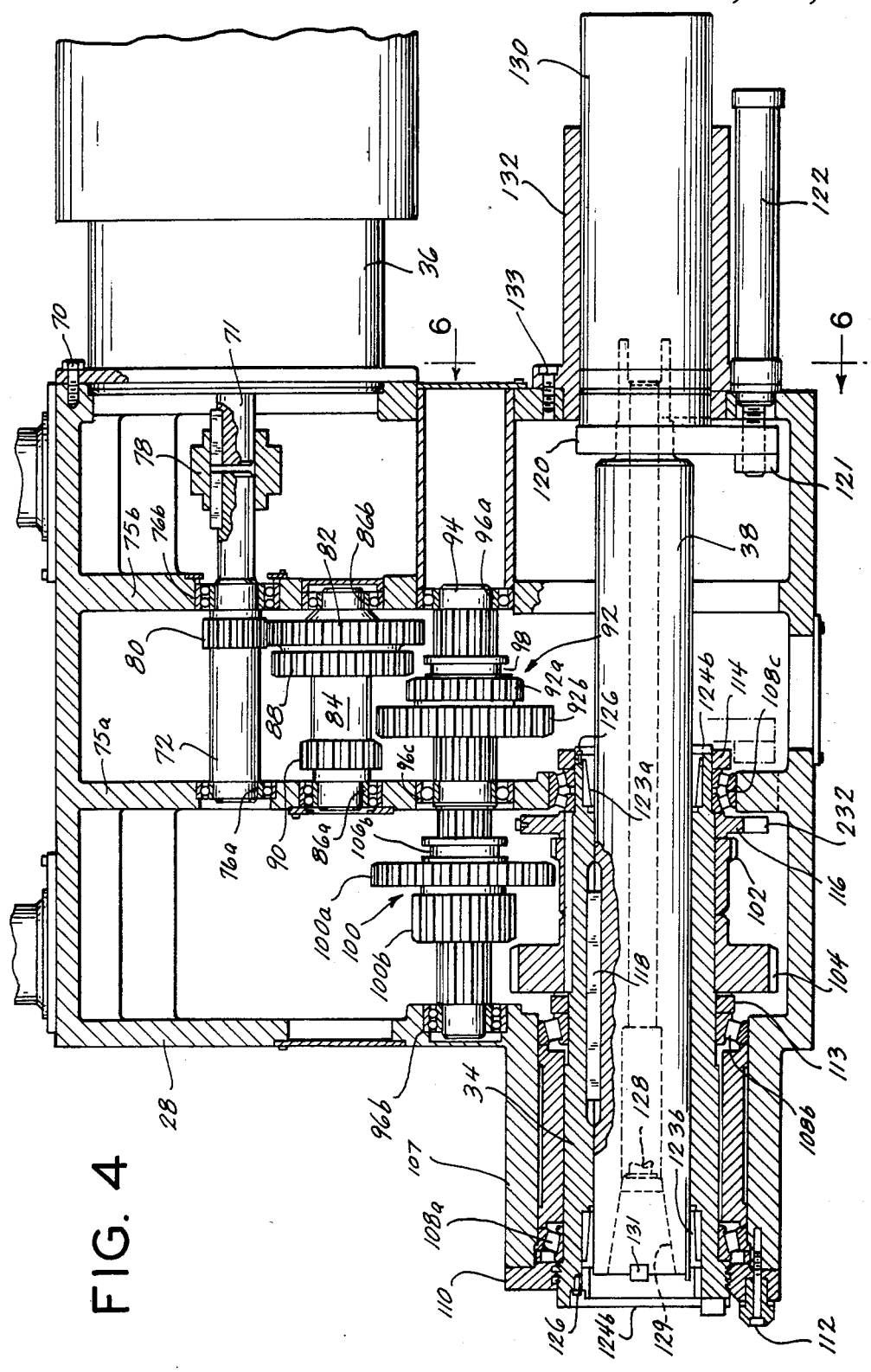
FIG. 4 is a cross sectional view of a portion of the automatic tool changing machining center of FIG. 2 taken along lines 4—4 thereof.

As illustrated in FIG. 4, which is a cross sectional view of spindlehead 28 taken along lines 4—4 of FIG. 2, spindle drive motor 36 is fastened to the rear (righthand end) of spindlehead 28 by bolts 70 (only one of which is shown) so that shaft 71 of the spindle drive motor extends into the spindlehead through a passage in the rear spindlehead wall parallel to spindle 34 and spindle bar 38. A shaft 72 is journaled through a pair of interior spindlehead walls 75a and 75b by bearings 76a and 76b, respectively, so as to be coaxial with shaft 71 of the spindle drive motor. A universal coupling 78 couples shaft 71 to shaft 72 so that when spindle drive motor 36 is energized by the machine tool control system, shaft 72 rotates co-jointly with spindle drive motor shaft 71.

Fixed on shaft 72 is a pinion gear 80 which is dimensioned complementary to, for meshing engagement with a gear 82 keyed on a shaft 84 journaled through spindle walls 75a and 75b by bearings 86a and 86b respectively, so as to be parallel to shaft 72. Two other gears 88 and 90, respectively, are keyed on shaft 84 in spaced apart parallelism with gear 82. Each of gears 88 and 90 is dimensioned complementary to, for meshing engagement with a separate one of gear members 92a and 92b of a cluster gear 92 which is in splined engagement with a shaft 94 journaled at each of its ends into spindlehead wall 75b and the forward end of spindlehead 28, respectively, by a separate one of bearings 96a and 96b, respectively. A third bearing 96c rotatably journals the medial portion of shaft 94 into wall 75a. Gear member 92a of cluster gear 92 has a shifting collar 98 integrated to its rearward face. Shifting collar 98 has a channel inscribed about the periphery thereof for engaging the tines of a shifter fork (not shown) which is connected to a three position hydraulically actuated shifter cylinder (not shown) that is controlled by the machine tool control system. By appropriately pressurizing the hydraulically actuated shifting cylinder, cluster gear 92 may be shifted from its central position as illustrated in FIG. 4 either rightwardly or leftwardly along shaft 94 to bring one of gear members 92a and 92b, respectively, into meshing engagement with a corresponding one of gears 88 and 90, respectively, keyed on shaft 94. In practice, gears 88 and 90 are dimensioned larger and smaller, respectively, than each of cluster gear members 92a and 92b, respectively, so that shaft 94 may be driven from shaft 84 at a speed faster than or slower than rotational speed of shaft 84 when cluster gear is biased rightwardly and leftwardly, respectively, from its central most position.

A second cluster gear 100, having a pair of gear members 100a and 100b, is in splined engagement with shaft 94 between wall 75a and the forward or leftward end of spindlehead 28. Each of cluster gear members 100a and 100b is dimensioned complementary to, for meshing engagement with, a separate one of gears 102 and 104 which are keyed on spindle 34 in spaced apart parallelism. A shifter collar 106 is integrated to the rearward or righthand face of cluster gear member 100a. The shifter collar has a groove inscribed about the periphery thereof for engaging the tines of a shifter fork (not shown) which is connected to the shaft of a three-position hydraulically actuated shifting cylinder (not shown) under the control of the machine tool control system. By appropriate pressurization of the hydraulically actuated shifting cylinder, cluster gear 100 may be shifting along shaft 94 rightwardly or leftwardly from its central most position illustrated in FIG. 4 to effect meshing engagement of a separate one of cluster gear members 100a and 100b with a separate one of gears 102 and 104, respectively. In practice, cluster gear members 100a and 100b are each dimensioned larger and smaller than gears 102 and 104, respectively, so that when cluster gear 100a is shifted rightwardly and leftwardly from its central most position, spindle 34 can be driven from shaft 94 at a speed greater than or less than, respectively, the rotational speed of shaft 94. Since shaft 94 can itself be driven at two different speeds from shaft 84 by appropriate shifting of cluster gear 92, the shifting of cluster gears 92 and 100 permits the ratio of the rotational speed of spindle 34 to the rotation speed of spindle motor drive shaft 71 to take on any one of four separate values.

In the presently preferred embodiment, spindle 34 is configured of an elongate sleeve or collar which extends into the spindlehead parallel to the shafts of 94 and 84 through a bore in an annular projection 107 which extends outwardly from the forward end of the spindlehead. A pair of bearings 108a and 108b are each carried on the spindle at forward (leftward) end of the spindle and a short distance rearwardly therefrom, respectively, for journaling the spindle into the bore through annular housing 107. Spindle bearing 108a is urged against a shoulder on the spindle by a bearing cap 110 having a bore therethrough dimensioned to receive the spindle. Bearing cap 110 is removably secured to the forward face of projection 107 by bolts 112 (only one of which is shown) to overlie the bore therethrough thereby permitting easy access to the bearing. Bearing 108b is carried on the spindle between a spindle shoulder and a nut 113 in threaded engagement with the spindle to urge the bearing against the shoulder. Spindle 34 carries a third bearing 108c adjacent to rearward spindle end for journaling the spindle through spindlehead wall 75a. A nut 114 in threaded engagement with the rearward end of the spindle urges bearing 108c against a keylock disk 116 carried on the spindle between gear 102 and spindlehead wall 75a. As will be described in greater detail hereinafter, keylock disk 116, when engaged by a plunger, described hereinafter with respect to FIG. 10, operates to lock the spindle in a predetermined angular orientation.

Spindle bar 38, which is concentric within spindle 34, is keyed to the spindle by a key 118 which is radially embedded into the periphery of spindle bar 38 so as to extend along the axis of the bar for mating engagement with a complementary keyway inscribed axially in the bore of spindle 34. Spindle bar 38, to virtue of its being keyed by spindle 34, can be extended from or retracted into the spindle while rotating co-jointly with the spindle. The mechanism for axially reciprocating the spindle bar within the spindle includes a yoke 120 which is disposede about the rearward spindle bar end. A bolt 121 fastens the end of the yoke to the shaft of a hydraulic cylinder 122 which is secured to the rearward end of the spindlehead so that its shaft extends into the spindlehead parallel to the spindle bar. When cylinder 122 is pressurized responsive to a command from the machine tool control system to extend the cylinder shaft from the cylinder, spindle bar 38, by virtue of its being linked to the shaft of cylinder 122 by yoke 120, is thus forced outwardly from spindlehead 28. Conversely, when cylinder 122 is pressurized to retract the cylinder shaft into the cylinder, spindle bar 38 is thus retracted into the spindlehead.

To assure that there is no radial play between spindle bar 38 and spindle 34, spindle 34 has a counter bore in each end thereof which is dimensioned to receive a separate one of a pair of tapered bushing sets 123a and 123b, respectively, which are each carried on the spindle bar. Each tapered bushing set is urged into the counter bore in a corresponding one of the ends of the spindle by a separate one of bearing caps 124a and 124b, respectively, which each have a bore therethrough dimensioned to receive spindle bar 38. Bolts 126 detachably secure each of bearing caps 124a and 124b to the rearward and forward ends of the spindle, respectively, so that each of the bearing caps overlies the counter bore in a separate one of the rearward and forward ends of the spindle, respectively.

Spindle bar 38 is fabricated with an axial bore therethrough which is dimensioned to receive a draw rod 128. Draw bar 128 extends rearwardly beyond the spindle bar into a quill 130 slidably mounted within a coaxial quill sleeve 132 fastened to the rearward end of spindlehead 28 by bolts 133 (only one of which is shown). Quill 130 houses the mechanism (described in greater detail hereinafter with respect to FIG. 7) which reciprocates draw rod 128 rearwardly and forwardly to urge the shank of a single toolholder or multiple spindle toolhead into engagement with, or to disengage the shank of a single toolholder or multiple spindlehead from the tool receiving socket 129 in the forward end of the spindle bar, respectively.

The details of how draw rod 128, when it is reciprocated rearwardly and forwardly, operates to engage a toolholder or multiple spindle toolhead shank in the tool receiving spindle bar socket, and to disengage it therefrom, respectively, may be seen more clearly by reference to FIG. 5 which is an enlarged view of the forward end of spindle bar 38. As illustrated, draw rod 128 has a bore in the forward end thereof which is threaded for mating engagement with the threads on the rearward end of a collet 134. Collet 134 has a plurality of forwardly extending tines 136 (only two of which are shown) for engaging the retention knob 138 extending rearwardly from the shank 139 of the single toolholder or multiple spindle toolhead then seated in tool receiving socket 129 in the forward end of spindle bar 38. When draw rod 128 is urged rearwardly (rightwardly), tines 136 of collet 134 are urged radially inwardly against retention knob 138 by an annular projection 141 which extends radially inwardly towards the center of the bore extending through the spindle bar. The radially inward force exerted by projection 141 against tines 136 urges the tines against the retention knob to assure that the toolholder is thus firmly retained in the spindle bar. Conversely, when draw rod 128 is urged forwardly (leftwardly) so that tines 136 are no longer urged radially inwardly against retention knob 138 by projection 141, then, the shank of the single toolholder or multiple spindle toolhead is no longer firmly engaged in the spindle bar tool receiving socket and can be removed from the spindle bar and replaced with a new toolholder or multiple spindle toolhead.

Although not essential to the operation of the present invention, draw rod 128 has a bore 142 therethrough in communication with a tube 144 within the collet for conducting coolant into collet tube 144 to enable coolant to be conducted through the collet tube into the tool and through the tool to the workpiece.

Figure 6:
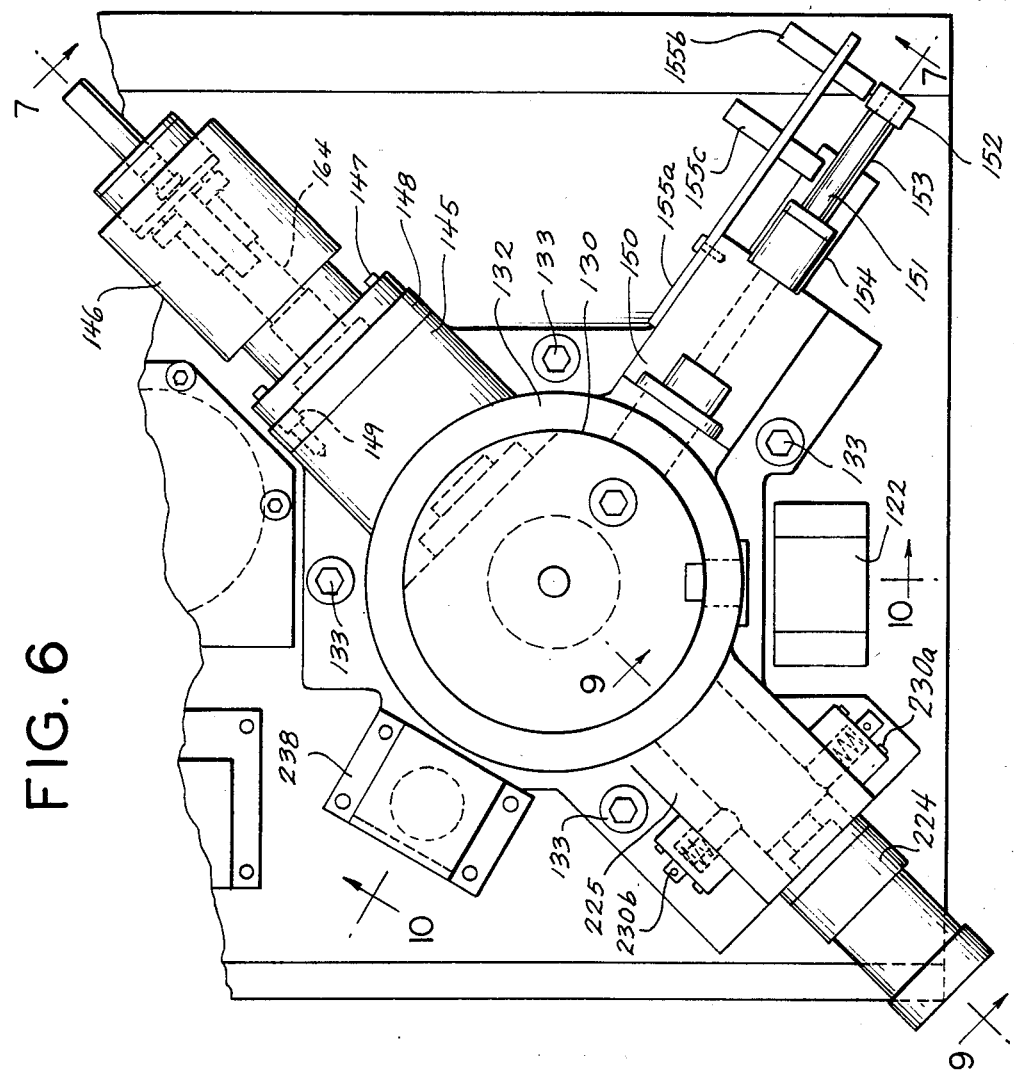
FIG. 6 is an end view of the spindlehead of the machining center of FIG. 1 taken along lines 6—6 of FIG. 4.
Figure 7:
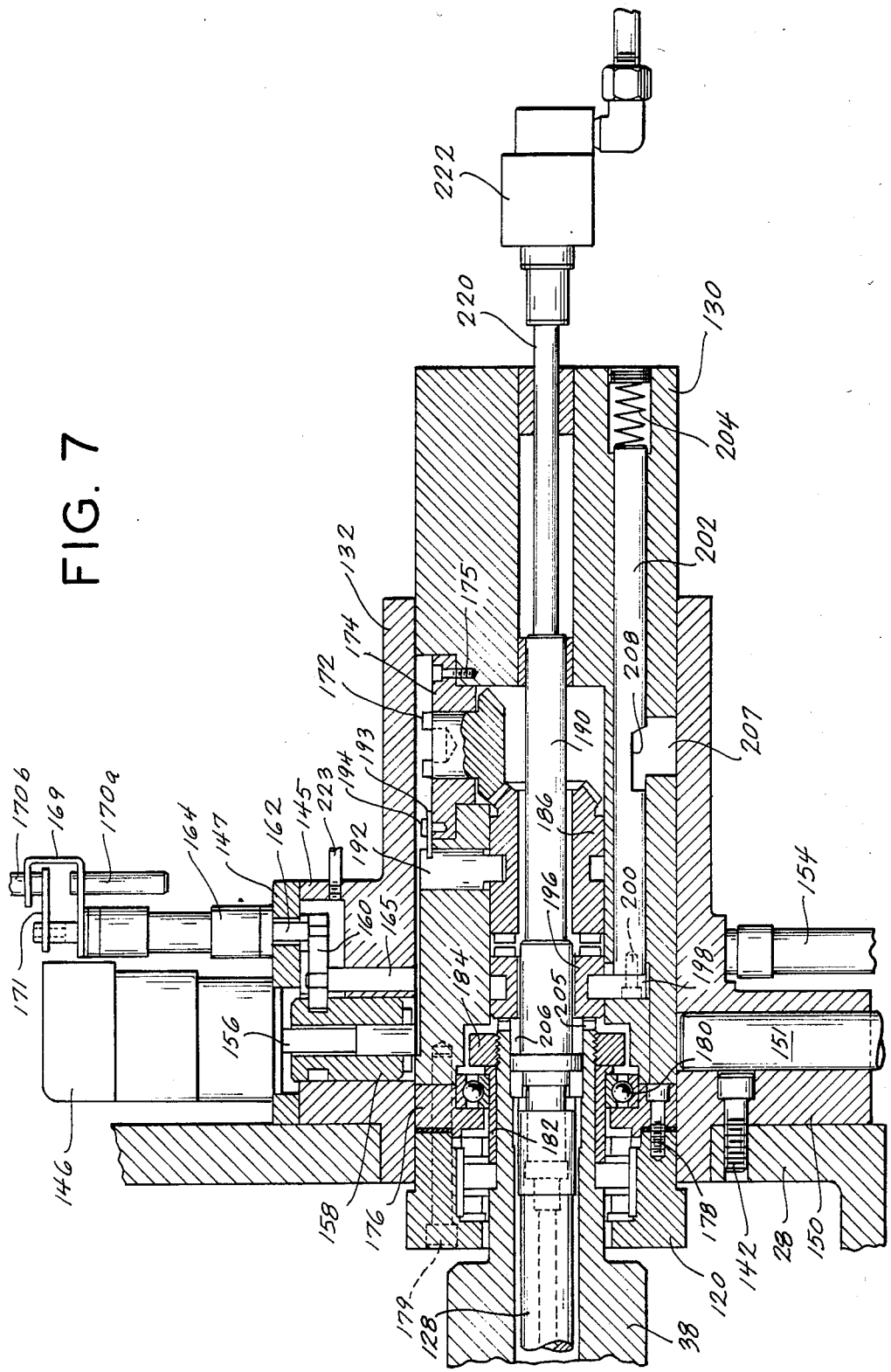
FIG. 7 is a cross sectional view of the draw rod driver motor and clutch mechanism of the machining center of the present invention taken along lines 7—7 of FIG. 6.

Referring now to FIG. 6 which is an end view of spindlehead 28 taken along lines 6—6 of FIG. 4, it can be seen that quill sleeve 132 has a housing 145 integrated thereto and extending perpendicularly therefrom. Housing 145 is typically disposed at an obtuse angle from cylinder 122. A draw rod driver motor 146 which, as will be seen hereinafter, reciprocates draw rod 128 (FIG. 4) forwardly and rearwardly within the spindle bar, is fastened by bolts 147 to a plate 148 which is fastened by bolts 149 to the end of housing 145 distal from the quill sleeve. The motor is thus mounted to the housing so that its shaft extends into housing 145 perpendicular to the axis of quill 130. Quill sleeve 132 has a second housing 150 integrated thereto perpendicular to the axis of the quill and disposed at an acute angle from quill sleeve housing 145. Housing 150 has a bore disposed therethrough perpendicular to the central axis of the quill for receiving a shaft 151 therein. Shaft 151 is linked by a yoke 152 to the shaft 153 of a springreturn hydraulic cylinder 154 which, as will be seen by subsequent reference to FIG. 7, is mounted to housing 150 parallel to shaft 151. A frame 155a is fastened to housing 150 so as to extend therebeyond parallel to shafts 151 and 153. Frame 155a carries a pair of parallel spaced apart proximity switches 155b and 155c. Proximity switches 155b and 155c are spaced apart on frame 155a such that when cylinder shaft 153 is fully outwardly extended beyond the cylinder, proximity switch 155b is actuated by yoke 152 while proximity switch 155c remains deactuated. Conversely, when cylinder shaft 153 is retracted into the cylinder following pressurization thereof to urge shaft 151 into housing 150, proximity switch 155c is actuated by yoke 152.

The details of how shaft 151, when urged through the quill housing into the quill by cylinder 153 operates to engage the clutch mechanism disposed in the quill for coupling drive motor 146 to the draw rod to enable draw rod driver motor 146 to reciprocate draw rod 128 coaxially within the spindle bar are illustrated in greater detail in FIG. 7 which is a cross sectional view taken along lines 7—7 of FIG. 6. As illustrated, draw rod driver motor 146 has a shaft 156 which extends into a recess within housing 145 for splined engagement with a drive gear 158 which has a set of drive teeth projecting from the bottom end thereof. Drive gear 158 has a groove or channel circumscribed about the periphery thereof for engaging one end of a horizontally oriented web 160 which is disposed within the recess in housing 145. Web 160 is attached at its opposite end to the shaft 162 of a spring-return hydraulic cylinder 164 which is secured to plate 147 so that its shaft 162 extends into the housing parallel to draw rod driver motor shaft 156. To assure that web 160 remains substantially horizontal when cylinder 164 is pressurized and de-pressurized to reciprocate the drive gear along the motor shaft from and towards, respectively, the draw rod drive motor, a guide pin 165 is seated in a bore disposed in the housing recess parallel to the motor shaft and, is secured at its upper end to web 160 between driver gear 158 and hydraulic cylinder shaft 162.

A substantially "U"-shaped frame 169 having a pair of horizontally oriented, parallel spaced apart sides, is fastened to the upper end of cylinder 164 so that shaft 162 of the cylinder extends perpendicularly through the bottom leg of the frame. A pair of proximity switches 170a and 170b are each fastened perpendicularly through a separate one of the legs of the frame 169 so as to be opposite each other and parallel to shaft 162. Fastened to the end of cylinder shaft 164 extending upwardly from cylinder 164 is a horizontally oriented finger 171. During intervals when cylinder 164 is depressurized, the internal cylinder spring urges the cylinder shaft into the cylinder, thereby displacing finger 171 into proximity with switch 170b, thus actuating the switch. Conversely, when cylinder 164 is pressurized, finger 171 is displaced away from proximity switch 170b towards proximity switch 170a causing the former switch to be deactuated and the later switch to be actuated, respectively. By monitoring the conduction states of proximity switches 170a and 170b, the machine tool control system can determine whether cylinder 164 has been pressurized.

The drive teeth extending from the lower end of drive gear 158 are complementary to the drive teeth projecting upwardly from the top end of a bevel gear 172 which is rotatably journaled in a bushing 174 secured in a recess radially disposed in the periphery of quill 130 by fasteners 175 so as to be in communication with the axially extending central bore through the quill. Before drive gear 158 can be urged into engagement with bevel gear 172 by cylinder 164 to facilitate transmission of rotational energy from the draw rod driver motor to bevel gear 172, quill 130 must be displaced outwardly (forwardly) from quill sleeve 132 to position bevel gear 172 in axial alignment with drive gear 158. Reciprocation of quill 130 within quill sleeve 132 is accomplished by cylinder 122 (FIG. 6). To this end, yoke 120, which is fastened to the shaft of cylinder 122 (FIG. 4), has a plate 176 attached to the rear end thereof by bolts 178 (only one of which is shown). The yoke and plate are jointly secured to the forward end of quill 130 by bolts 179 (only one of which is shown) which extends through the yoke and the plate into the quill. When plate 176 is urged into face to face relationship with quill 130 by bolts 179, a bore in the rearward face of plate 176 communicates with a like-sized bore in the forward face of quill 130 to form a pocket for rebore a bearing 180 which is carried on a sleeve 182 that circumscribes the rearward end of spindle bar 38 extending through yoke 120 and plate 176 into quill 130. A nut 184 in threaded engagement about the rearward end of spindle bar 38 within quill 130 urges the flanged rearward end of sleeve 182 against the inner race of bearing 180. By virtue of the above described engagement of yoke 120 with quill 130, spindle bar 38 and quill 130 are displaced forwardly when cylinder 122 (FIG. 4) is pressurized. Conversely, when cylinder 122 is de-pressurized causing the cylinder shaft to be retracted into the cylinder, yoke 120 thus urges spindle bar 38 and quill 130 rearwardly.

Once quill 130 is displaced to its forward most position by yoke 120 and cylinder 122 so that bevel gear 172 is in alignment with drive gear 158, cylinder 164 can then be pressurized to urge drive gear 158 into driving engagement with bevel gear 172. Bevel gear 172 transmits the rotational energy imparted thereto by drive gear 158 to a collar 186 rotatably journaled into the bore through the quill so as to be perpendicular to, and in driving engagement with, gear 172. Collar 186 is rotatably journaled about a shaft 190 which is journaled for rotation within the centrally disposed, axially extending bore through the quill. Collar 186 is constrained from moving axially on shaft 190 by a pin 192 which is seated in an annular groove disposed radially in the quill so as to be perpendicular to the central axis of shaft 190. A horizontally disposed key 193 is fastened to the top of bushing 174 by bolt 194 and extends from the bushing into a groove inscribed circumferentially about the periphery of pin 192 to constrain the pin against vertical movement.

Collar 186 is fabricated with a set of drive teeth that project from the forward end thereof for mating engagement with the drive teeth on the rearward end of a drive gear 196 carried on the forward end of shaft 190 in splined engagement therewith so as to rotate co-jointly with the shaft. Gear 196 has a groove circumferentially inscribed in the outer periphery thereof for engaging a vertically oriented pin 198 which is secured by a bolt 200 to the forward (leftward) end of a rod 202 that is disposed in an axially extending bore in the quill for axial movement within this bore along a path parallel to the axis of rotation of shaft 190. A spring 204, disposed between the rearward (rightward) end of rod 202 and the rearward quill wall urges rod 202 forwardly to bias gear 196 away from collar 186 and against a spacer 205 carried on the rearward end of a sleeve 206 circumscribing the forward end of shaft 190. While drive gear 196 is forwardly biased by the combination of pin 198, rod 202 and spring 204, drive gear 196 remains disengaged from collar 186. Once quill 130 is urged forwardly by cylinder 122 (FIG. 6) to align the teeth on bevel gear 172 with the drive teeth on gear 158, shaft 151 becomes aligned with an opening 207 radially into the quill. Pressurizing cylinder 154 serves to urge shaft 151 through opening 207 and into a chamfered bore 208 in bar 202 which is slightly offset from opening 207. As shaft 151 enters chamfered bore 208, the shaft urges the bar 202 rearwardly against spring 204 causing the combination of pin 198 and bar 202 to bias drive gear 196 rearwardly into engagement with collar 186. During intervals while drive gear 196 is biased into engagement with collar 186, rotational energy can be transmitted from the draw rod driver motor to the shaft 190 so that the shaft may be threaded into or off of draw rod 128 in a manner described in greater detail hereinafter to urge the draw rod rearwardly and forwardly, respectively, to engage and disengage, respectively, a toolholder loaded in the tool receiving socket in the forward end of spindle bar 38.

Figure 8:
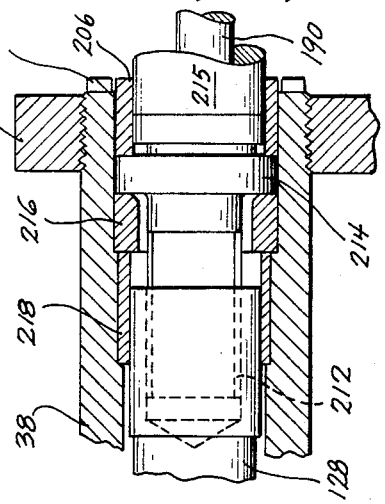
FIG. 8 is an enlarged sectional view of a portion of the draw rod driver motor arrangement depicted in FIG. 7.

The details of how shaft 190 threadedly engages draw rod 128 to reciprocate the draw rod within the spindle bar may be best seen by reference to FIG. 8 which is an enlarged sectional view of the forward end of shaft 190 of FIG. 7. As illustrated, a threaded stud 212 has its flanged head 214 integrated to the head 215 of shaft 190 for co-joint rotation with the shaft. The threads of stud 212 matingly engage complementary threads on the interior surface of a bore in the rearward end of draw rod 128. When shaft 190 is rotatably driven in a clockwise direction, threaded stud 212 is threaded into draw rod 128 to urge the draw rod rearwardly. A spacer washer 216, having an interior bore large enough to receive stud 212, but smaller than the outer diameter of draw rod 128, is carried on the stud between the leftward side of the flanged head 214 of the stud and a sleeve 218 circumscribing the rearward end of the draw rod for absorbing the forward thrust of the flanged end 214 of stud 212 as the stud is threaded into the draw rod. Sleeve 206, which circumscribes head 215 of shaft 190, absorbs the rearward thrust exerted by flanged end 214 thereagainst as stud 212 is threaded out from draw rod 128.

Referring back to FIG. 7 it will be recalled that draw rod 128 may advantageously be made hollow to conduct coolant into a single toolholder or multiple spindle toolhead. Where the draw rod is made hollow, shaft 190 is likewise made hollow and is fabricated with a coolant tube 220 extending rearwardly therebeyond for coupling to a rotary fluid coupling 222 which supplies coolant into the coolant tube 220 from a source of coolant (not shown). Rotary coupling 222 advantageously conducts coolant from the coolant source into coolant tube 220 as shaft 190 and coolant tube 220 rotate co-jointly.

As further illustrated in FIG. 7, a lubrication inlet 223 is disposed into housing 145 for conducting lubricating fluid from a source of lubricating fluid (not shown) into the housing. The lubricating fluid conducted into housing 145 through lubrication inlet 223 lubricates bevel gear 172 and also lubricates collar 186 and gear 196 when they are brought into alignment with drive gear 158 following the forward (leftward) movement of quill 130.

Figure 9:
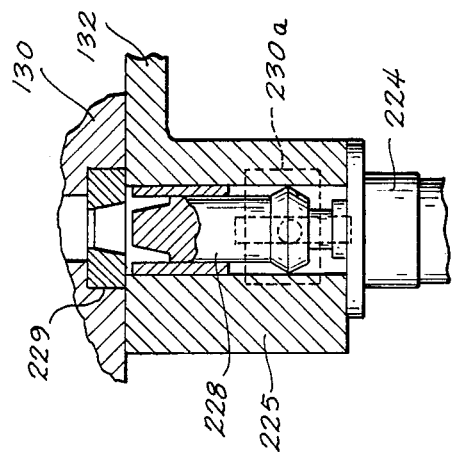
FIG. 9 is a cross sectional view of the quill shot pin mechanism of the automatic tool changing machining center of FIG. 1 taken along lines 9—9 of FIG. 6.

As indicated previously, spindle bar 38 can be extended outwardly from the spindlehead at times other than during a tool change cycle to facilitate a deep boring or drilling operation when the appropriate toolholder is secured in the tool receiving socket of the spindle bar. Referring now to FIG. 6, quill 130, and hence spindle bar 38, are locked against transverse movement, once the spindle bar is forwardly extended from the spindlehead by a quill shot pin cylinder 224 which is secured to a housing 225 integrated to, and extending perpendicularly from, quill sleeve 132 so that the quill shot pin cylinder shaft (not shown) extends into housing 225 perpendicularly to the longitudinal quill axis. The details of how quill shot pin cylinder 224 operates to lock quill 130 and hence, spindle bar 38 against transverse movement may best be understood by reference to FIG. 9 which is a cross sectional view taken along lines 9—9 of FIG. 6. As illustrated, the shaft of cylinder 224 (shown in phantom) extends into a bore in housing 225 in communication with quill 130. Disposed within this bore in housing 225 is a quill shot pin 228 which is secured at one end thereof to the shaft of cylinder 224 so as to be reciprocated within the bore responsive to pressurization of cylinder 224. The end of quill shot pin 228 distal from cylinder 224 is chamfered for mating engagement in a complementary chamfered quill shot pin seat 229 pressed into a bore in the outer periphery of the quill. The relative location of quill seat 229 in the periphery of quill 130 is such that when the spindle bar and the quill are at their forward most position, quill seat 229 is in alignment with quill shot pin 228 so as to enable the quill shot pin seat to receive the chamfered end of the quill shot pin following pressurization of cylinder 224. Thus, pressurization of cylinder 224 serves to lock quill 130 and hence, spindle bar 38 (FIG. 6) against transverse movement. Referring back to FIG. 6 for a moment, a pair of limit switches 230a and 230b are fastened on opposite sides of housing 225. Each limit switch, such as limit switch 230a illustrated in phantom in FIG. 9 has an actuator extending through the housing so as to contact the quill shot pin as it is reciprocated. Limit switches 230a and 230b are spaced apart such that limit switch 230a is actuated by the quill shot pin when the quill shot pin is furthest from the quill as illustrated in FIG. 9, which occurs when cylinder 224 is de-pressurized. Conversely, limit switch 230b is actuated by the quill shot pin when the shot pin is urged into engagement with the quill shot pin seat. Thus, by monitoring the relative conduction states of limit switches 230a and 230b, the machine tool control system can readily ascertain the relative position of quill shot pin 228 within housing 225.

In addition to locking quill 130 and hence, spindle bar 38 against axial movement, particularly during a tool change cycle, it is also desirable to lock the spindle bar against rotational movement, especially during a tool change cycle so that the toolholder keyway (not shown) inscribed in tool receiving socket 129 (FIG. 4) in the forward end of the spindle bar is in alignment with the key on the shank of the toolholder or multiple spindle toolhead, thereby assuring firm engagement of the single toolholder or multiple spindle toolhead input shank in the spindle bar tool receiving socket. Referring now to FIG. 10, which is a cross sectional view taken along lines 10—10 of FIG. 6, locking of the spindle bar against angular rotation is accomplished by a plunger 236 which is journaled through interior spindlehead walls 75a and 75b so as to be parallel to spindle bar 38. The rearward (rightward) end of plunger 236 is coaxial with, and is secured to the shaft of a spring returned hydraulic cylinder 238 which is attached to the rearward end of spindlehead 28 so as to be parallel with quill 130. When hydraulic cylinder 238 is pressurized in response to a command from machine tool command system, the cylinder shaft and hence, plunger 236 are urged forwardly (leftwardly) so that the forward end of the plunger extends into one of the passage ways disposed through keylock disk 116 at equidistantly spaced intervals adjacent to the periphery of the keylock disk. While cylinder 238 remains pressurized, plunger 236 remains in engagement with the keylock disk so as to prevent spindle bar rotation.

At the rearward end of hydraulic cylinder 238, there is affixed a pair of limit switches 240a and 240b which are each coupled to the machine tool control system. Limit switch 240a is actuated by the rearward end (not shown) of the hydraulic cylinder shaft when cylinder 238 is de-pressurized and conversely, switch 240b is actuated by the hydraulic cylinder shaft when cylinder 238 is pressurized. Thus, by monitoring the conduction state of limit switches 240a and 240b, the machine tool control system can ascertain whether or not cylinder 238 has in fact been pressurized to facilitate locking of the spindle bar against rotational measures.

To assure that the spindle bar is at a predetermined angular orientation prior to pressurization of hydraulic cylinder 238, keylock disk 116 has a dog 242 extending radially from the periphery of the keylock disk. A plurality of proximity switches 244 (only one of which is shown) are secured within the interior of spindlehead 28 in spaced apart relationship about the orbit of dog 242 so that each proximity switch is actuated by dog 242 when keylock disk 116 is oriented at a particular angular orientation. By sensing the present conduction state of each of proximity switches 244 and by recalling the conduction states each of proximity switches 244 during the just-prior interval, the machine tool control system can ascertain not only the relative angular orientation of the spindle bar, but also can discern the direction of the spindle bar rotation. In this way, machine tool control system can determine whether or not spindle bar is at a particular angular orientation prior to pressurizing cylinder 238 to lock the spindle bar against rotation.

The counter balancing apparatus which counterbalances tool transfer arm carrier 50 as it moves on tower 46 along the Y axis is illustrated in FIG. 11. The heart of the counterbalancing apparatus is a hydraulic cylinder 248 which is secured to the side of tower 46 by bolts 249 so that the shaft 250 of the cylinder extends upwardly from the cylinder parallel to the Y axis. Cylinder 248 is typically fabricated so that shaft 250 is spring biased downwardly into the cylinder, the force required to bias shaft 250 upwardly being approximately equal to the downward gravitational force on tool transfer arm carrier 50. The upward end of cylinder shaft 250 is linked to the tool transfer arm carrier by a chain 251 which passes across the top of the tower over each of a pair of sheaves 252a and 252b which are each rotatably journaled in a separate one of sheave housings 254a and 254b, respectively, each secured to a separate one of plates 258a and 258b, respectively, fastened to the top of tower 46. Although it would be feasible to link the end of chain 251 directly to the upward most end of cylinder 250, in the presently preferred embodiment, a sheave 260 is affixed to the upward most end of cylinder shaft 250 so that the chain passes through sheave 260 and is attached to the underside of plate 258b. Employing a sheave 260 at the upward most end of cylinder shaft 250 for passing the chain therethrough serves to increase the mechanical advantage of cylinder 248 and thus allows use of a smaller, less expensive cylinder than would be the case if the mechanical advantage of the cylinder were reduced by virtue affixing the end of chain 251 directly to the upper most end of the cylinder shaft.

The details of how sheave 252b is secured in sheave housing 254b are illustrated in FIG. 12 which is a cross sectional view taken along lines 12—12 of FIG. 11. Since the details of sheave 252a and sheave housing 254a are identical to the details of sheave 252b and sheave housing 254b, only sheave 252b and sheave housing 254b are described in detail hereinafter. As may be observed from FIGS. 12, sheave housing 254b comprises a horizontal bottom plate 262 which is secured by bolts 264 to plate 258b which is secured to the top of tower 46. A pair of vertically extending walls 266a and 266b are each fastened to plate 262 in spaced apart parallelism typically by being welded thereto. Sheave 252b is interposed between walls 266a and 266b and is supported from the walls by a pin 268 which is horizontally journaled through the walls. A roller bearing 270, circumscribing the medial portion of pin 268, rotatably journals sheave 252b about pin 268 so as to permit the sheave to rotate freely.

It should be noted that ability of tool change arm carrier 80 to be positioned at any location along tower 46 not only enables the tool change arm to engage tools from any of the three tool storage disks 62 but also enables the tool change arm to be moved to any Y axis coordinate location of the spindle to enable tool exchange with the spindle without first having to locate the spindle to a Y axis home position.

Referring now to FIGS. 13–16, there are shown the details of how housing 55 carries pivot 56. As is illustrated in FIG. 13 which is the front view of the housing, a plurality of threaded passages 272, typically four in number, are disposed longitudinally into pivot 56 parallel to the central axis of the pivot, each passage receiving the threaded end of bolt (not shown) extending through the tool change arm into the pivot. To facilitate rotation of the tool change arm about each of a pair of mutually orthogonal axes, housing 55 is secured by bolts 278 (only one of which is shown) to the outwardly exposed face of pivot 53 so that the housing rotates with pivot 53 about an axis perpendicular to the axis of rotation to the pivot 56 journaled within the housing. Driving engagement between housing 55 and pivot 53 is assured by a key 280 (FIG. 13) which is fastened to the housing by a bolt 282 so that the key engages a complementary keyway (not shown) inscribed in the outer periphery of the pivot.

Figure 16:
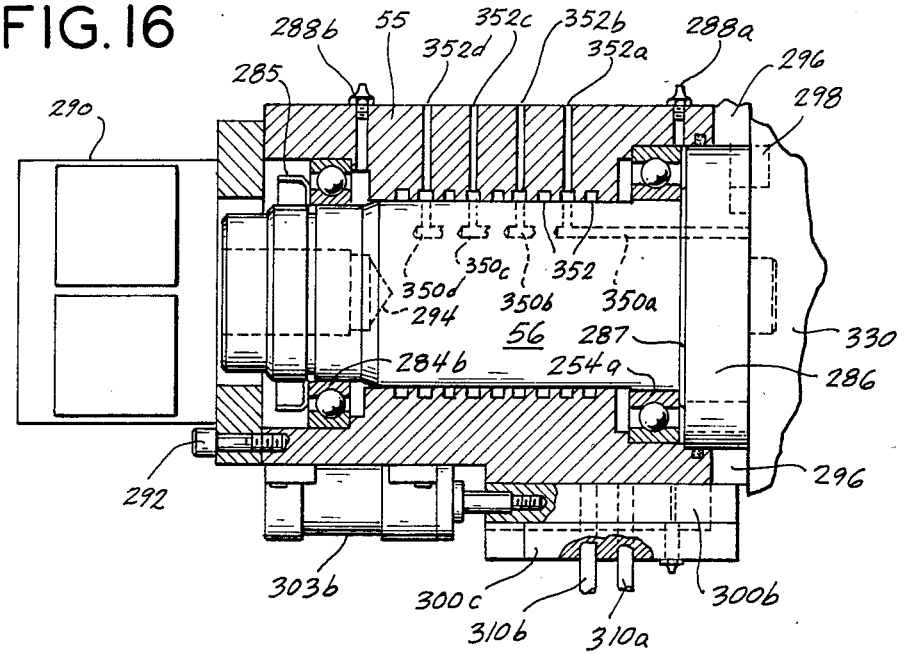
FIG. 16 is a cross sectional view taken along lines 16—16 of FIG. 13 illustrating the internal details of the tool transfer arm carrier.

The interior details of housing 55 are illustrated in FIG. 16 which is a cross sectional view taken along lines 16—16 of FIG. 13. As illustrated, pivot 56 is rotatably journaled in housing 55 by a pair of bearings 284a and 284b carried on the forward and rearward ends, respectively, of the pivot. The pivot is restrained from axial movement within the housing by a nut 285 which threadedly engages the rearward end of the pivot so as to bear against the inner race of ball bearing 284b whose outer race about a shoulder which extends radially inwardly into the bore in the housing which receives the pivot. When nut 285 is threaded onto the rearward end of the pivot so as to bear against the inner race of ball bearing 284b, the rearward edge of the flange 286 integrated to the forward end of the pivot bears against a spacer 287 to urge the spacer against the inner race of ball bearing 284a whose outer race abuts a shoulder within the housing extending radially inwardly into the bore through the housing thus preventing axial pivot movement. Lubricating fluid is supplied to each of bearings 284a and 284b from a source of lubricating fluid (not shown) through a separate one of lubrication passages 288a and 288b, respectively, disposed through housing 276 in communication with each separate bearing.

Pivot 56 is rotatably driven by a rotary hydraulic actuator 290 which is fastened rearward (leftward) to the end of housing 55 by bolts 292 (only one of which is shown) so that the shaft 294 of the rotary hydraulic actuator extends through an opening in the rearward end of housing for splined engagement with the rearward end of the pivot. When pivot 56 is rotatably driven by rotary hydraulic actuator 290 following pressurization of the hydraulic actuator responsive to a machine tool control system command, the pivot imparts a rotational torque to a hollow bore cam plate 296 which circumscribes the flanged end 286 of pivot 56. Cam plate 296 is keyed by a key 298 to the flanged end 286 of pivot 56 and the cam plate is bolted and doweled to tool change arm 57 so as pivot 56 is rotatably driven by rotary hydraulic actuator 290, the cam plate and the tool change arm rotate co-jointly with the pivot. As will be described in greater detail with respect to FIG. 19, cam plate 296 limits the orbit of tool change arm 57 rotation as the tool change arm is rotatably driven by the pivot following cam plate contact with a stop member described hereinafter) when the stop member is extended forwardly from housing 55.

Figure 15:
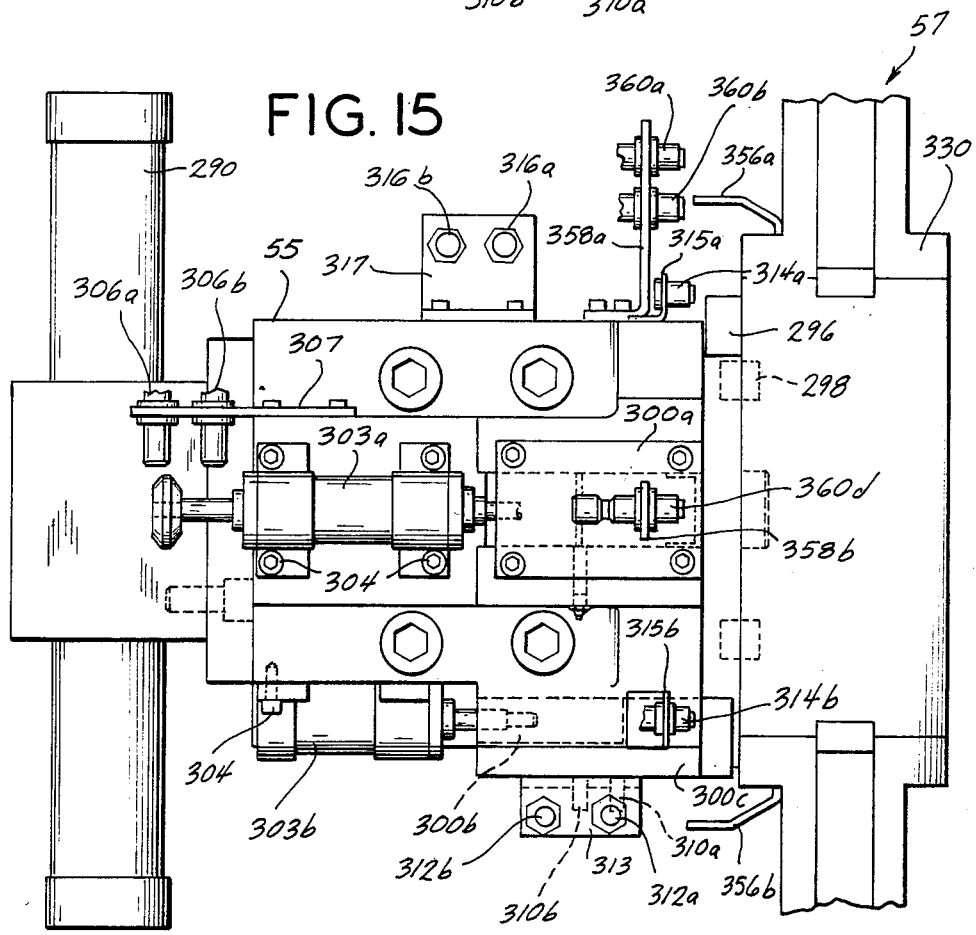
FIG. 15 is an enlarged side view of a portion of the tool transfer arm carrier of the automatic tool changing machining center of the present invention.

Referring now to FIGS. 15 and 16 jointly, two movable stop members 300a and 300b are each slidably fastened on the side and bottom, respectively, of housing 55 so as to be retractable towards and extendable away from the housing along a path parallel to the axis of pivot 56 rotation. A fixed stop member 300c is mounted to housing 55 parallel to and directly beneath movable stop member 300b. Each of movable stop members 300a and 300b is displaced along its axis towards, and away from cam plate 296 by a separate one of a pair of spring return hydraulic cylinders 303a and 303b, respectively, which are each secured to the side and bottom of housing 55, respectively, by bolts 304 so that the shaft of each hydraulic cylinder is coaxial with, for coupling to, a separate one of stop members 300a and 300b, respectively.

To ascertain the relative position of movable stop member 300a during machine tool operation, a pair of proximity switches 306a and 306b are mounted in a frame 307 which is secured to housing 55 so as to extend rearwardly therebeyond parallel to that portion of the shaft of cylinder 303a extending rearwardly from the cylinder. Proximity switches 306a and 306b are perpendicularly mounted in frame 307 in parallel spaced apart relationship so that switch 306a, which is furthest from the housing, is actuated by an annular flange on the rearwardly extending portion of the shaft of cylinder 303a while the cylinder is de-pressurized. Pressurization of cylinder 303a to urge stop member 300a forwardly (rightwardly) into engagement with the cam plate, causes the rearwardly extending portion of the cylinder shaft to be retracted into cylinder 303a so that switch 306b is actuated by the cylinder shaft annular flange while switch 306a becomes deactuated. Thus, by monitoring the conduction state of each of proximity switches 306a and 306b, the machine tool control system can readily ascertain whether or not cylinder 303a has been pressurized to urge movable stop member 300a forwardly into contact with cam 296 to limit the orbit of tool change arm 57.

Because of the close spacing between the rearward end of hydraulic cylinder 303b and rotary hydraulic actuator 290, a slightly different proximity switch arrangement is provided for detecting the pressurization of cylinder 303b than the proximity switch arrangement described above for detecting the movement of movable stop member 300a. Referring now to FIG. 15, it can be observed that movable stop member 300b has a pair of parallel, spaced apart pins 310a and 310b extending downwardly from the stop member through a longitudinal channel in fixed stop member 300c. A pair of parallel, spaced apart proximity switches 312a and 312b are each horizontally secured in a frame 313 affixed to stop member 300c so that each switch is perpendicular to each of pins 310a and 310b. The spacing between proximity switches 312a and 312b is such that when hydraulic cylinder 303b is de-pressurized to urge stop member 300b rearwardly away from cam plate 296, switch 312b is in proximity with and is actuated by pin 310b. Conversely, when cylinder 303b is pressurized to urge stop member 300b forwardly to engage cam plate 296 in a predetermined orientation, so as to limit the orbit of tool change arm 57, switch 312a is in proximity with, and is actuated by pin 310a. Thus, by monitoring the conduction states of each of proximity switches 312a and 312b, the machine tool control system can readily ascertain the relative position of stop member 300b.

Referring back to FIGS. 13 and 14, proximity switches 314a and 314b are each horizontally secured in a separate one of frames 315a and 315b, respectively, which are mounted to the top and to the side of housing 55 so that proximity switches 314a and 314b are in direct vertical alignment with each other. Each of proximity switches 314a and 314b is secured by its corresponding frame in face to face relationship with cam plate 296 (FIG. 15) so as to be activated by one of the lobes of cam plate 296 (described in detail with respect to FIG. 19) when cam plate lobe is directly opposite to the proximity switch. As will become clear hereinafter, by monitoring the present conduction states of proximity switches 314a and 314b and by memorizing the previous conduction states of proximity switches 314a and 314b, the machine tool control system can ascertain relative angular orientation of the tool change arm.

To sense the angular orientation of housing 55 as the housing is rotated by pivot 53 about the central axis of the pivot, a pair of proximity switches 316a and 316b are each horizontally secured in a frame 317 mounted to the top of the housing as illustrated in FIG. 15. Switches 316a and 316b are secured in frame 317 in parallel, spaced apart relationship so that each switch, such as switch 316a illustrated in FIG. 13, is opposite to and in face to face relationship with the side of tool change arm carrier 50. Affixed to the side of the tool change arm carrier within the orbit of the proximity switches is a pair of trip dogs 320 (only one of which is shown in FIGS. 13 and 14), the trip dogs being separated by a 90° arc so that after housing 55 is rotated from its vertical position, as illustrated in FIGS. 13 and 14 to its horizontal position, as illustrated in FIG. 2 one of the proximity switches, is actuated by one of trip dogs 320. Conversely, after the housing is rotated from its horizontal to its vertical position, the other of the proximity switches is actuated by the other of the trip dogs. By monitoring the conduction state of proximity switches 316a and 316b, the machine tool control system can ascertain the relative angular orientation of the housing.

The details of tool transfer arm 57 are illustrated in FIG. 17 and 18, FIG. 17 being a frontal view of the tool change arm and FIG. 18 being a cross sectional view of the tool change arm taken along lines 18—18 of FIG. 17. In the presently preferred embodiment, the tool change arm includes a hub 330 which is secured by bolts 278 (FIG. 17) to pivot 56 so that the rearward (leftward end of the hub is in face-to-face relationship with cam plate 296 which circumscribes the pivot as illustrated in FIG. 18. Integrated to each of the ends of hub 330 is a separate one of hub projections 332a and 332b, respectively. As illustrated in FIG. 18, each of a pair of plates 336a and 336b is fastened to a separate one of forward and rearward edges, respectively, of hub projection 332a so that the plates extend from the hub projection in spaced apart parallelism. In a likewise fashion, each of a pair of plates 336c and 336d is fastened to the front and rearward edges, respectively, of hub projection 332b so that the plates extend from the hub projection in spaced apart parallelism.

Interposed between plates 336a and 336b, so as to extend therebeyond, are a pair of opposing jaws 338a and 338b, each jaw pivoting about a separate one of pins 340a and 340b, which are perpendicularly disposed through the plates. Interposed between plates 336c and 336d are a pair of opposing jaws 338c and 338d, each jaw being pivotal about a separate one of pins 340c and 340d which are perpendicularly disposed through plates 336c and 338d. Each pair of opposing jaws such as jaws 338c and 338d, when pivoted towards each other, serve to engage a shank of a toolholder 58 or multiple spindle toolhead 59 interposed between the jaws. Conversely, when each of the pair of opposing jaws, such as jaws 338a and 338b, for example, are pivoted apart from each other, the shank of the toolholder or multiple spindlehead, previously gripped by the jaws is thus released therefrom.

Each of the opposing jaws 338a and 338b is pivoted towards and away from each other by a separate one of webs 342a and 342b, respectively, which are each pinned at one end thereof to the end of a separate one of jaws 338a and 338b, respectively. Webs 342a and 342b are jointly pinned at their opposite end to the shaft 343a of a hydraulic cylinder 344a which is disposed within hub 330 so that cylinder shaft 343a extends outwardly from the hub in spaced apart parallelism between plates 336a and 336b as illustrated in FIG. 18. Hydraulic cylinder 344a has a pair of inlet ports 346a and 346b associated therewith for conducting hydraulic fluid into the cylinder on opposite sides of a piston 347a which is carried on the end of cylinder shaft 343a disposed within the cylinder. Inlet ports 346a' and 346b are each connected by a separate pair of passages 348a and 348a' and 348b and 348b', respectively, to a separate one of a pair of fluid channels 350a and 350b which, as illustrated in FIG. 16 are disposed axially in pivot 56 for conducting hydraulic fluid to cylinder 344a.

Jaws 338c and 338d are each pinned at their inward most end to the end of a separate one of webs 342c and 342d, respectively. Webs 342c and 342d are jointly pinned at their opposite ends to the shaft 343b of a hydraulic cylinder 344b which is disposed within hub 330 so that the shaft 343b of the cylinder is interposed between plates 336c and 336d in spaced apart parallelism with both plates. Hydraulic cylinder 343b has a pair of inlet ports 346b and 346b' associated therewith for conducting hydraulic fluid into the cylinder at opposite sides of a piston 347b at the end of cylinder shaft 343b disposed within the cylinder. Each of inlet ports 346b and 346b' is linked by a pair of interconnecting passageways 348c and 348c' and 348d and 348d', respectively, to a separate one of fluid channels 350c and 350d disposed longitudinally through pivot 56 (FIG. 16). Although not shown, means are provided within each of cylinders 344a and 344b to bias the cylinder shaft outwardly from the cylinder so that in the event of a hydraulic failure, no accidental tool release occurs.

Referring back to FIG. 16, it can be observed that each of axially extending passageways 350a-350d in pivot 56 communicates with a separate one of fluid inlets 352a-352d, respectively, disposed through housing 55. Although not shown, each fluid inlet is connected to a source of hydraulic fluid through a valve actuated by the machine tool control system. In this manner, cylinders 344a and 344b (FIG. 17) can be actuated independently of one another so as to enable a tool gripped by one of the pair of opposing jaws to be released without release of the tool gripped by the other pair of opposing jaws. To avoid the leakage of hydraulic fluid carried by one of fluid inlets into an adjacent inlet, each of fluid inlets 352a–352d is separated by an oil trap 354 on either side thereof for trapping any of the hydraulic fluid leaking from the inlet. By trapping the oil leaking from an adjacent inlet, oil traps 354 tend to prevent inadvertent pressurization of hydraulic cylinders 344a and 344b (FIG. 17).

As illustrated in FIG. 15, tool change arm 57 has a pair of fingers 356a and 356b, each on opposite ends of hub 330. As is better shown in FIG. 18, each of fingers 356a and 356b is affixed to a separate one of shafts 343a and 343b, respectively, of cylinders 344a and 344b, respectively, so that each finger extends substantially horizontally from the cylinder shaft through a channel in a separate one of plates 336b and 336d, respectively. When a separate one of the hydraulic cylinders of the tool change arm, such as cylinder 344a, for example, is pressurized to urge an associated pair of opposing jaws, such as jaws 338a and 338b, apart to release the toolholder or multiple spindlehead shank previously gripped between the jaws, then 356a is urged radially inwardly (downwardly in FIG. 18) to a second position from its first or radially outer most (upward most) position. Conversely, if a tool change arm hydraulic cylinder, such as cylinder 344b, were pressurized to urge its associated jaws such as jaws 338c and 338d towards one another to engage the shank of a toolholder or multiple spindle toolhead therebetween, then, finger 356b would move to its first or radially outward most position from its second or radially inward most position. Thus, the radial location of each of fingers 356a and 356b from hub 330 is indicative of whether or not the jaws of a corresponding one of opposing jaw pairs 338a and 338b and jaw pairs 338c and 338d, respectively, are engaging the shank of a toolholder or multiple spindle toolhead therebetween.

As is best illustrated in FIGS. 13 and 14, housing 55 has a pair of right angle frames 358a and 358b attached to the top and the outwardly exposed side of the housing, respectively. Frames 358a and 358b each secure a pair of horizontally mounted proximity switches 360a and 360b and 360c and 360d, respectively. Proximity switches 360a and 360c are each mounted in a separate one of frames 358a and 358b, respectively, so that each proximity switch lies within the orbit made by fingers 356a and 356b as the tool change arm is rotated while each finger is at its first or radially outward most position. Proximity switches 360b and 360d are each secured in a separate one of frames 358a and 358b, respectively, so that each proximity switch lies within the orbit made by fingers 356a and 356b as the tool change arm rotates while each finger is at its second or radially inward most position. When tool change arm 57 is vertically oriented as illustrated in FIG. 18, so that finger 356a lies vertically above finger 356b, then, switch 360a is actuated and switch 360b is deactuated while jaws 338a and 338b (FIG. 18) are biased together to engage the shank of a single toolholder or multiple spindle toolhead therebetween. Conversely, at the same orientation of the tool change arm, the conduction states of switches 360a and 360b reverses once jaws 338a and 338b are biased apart to release the shank of the toolholder or multiple spindle toolhead previously engaged therebetween. In a similar manner, when tool change arm 57 is horizontally oriented as illustrated in FIG. 1, so that finger 356b (FIG. 18) overlies frame 358b (FIG. 19), then switch 360d is actuated and switch 360c is deactuated while jaws 338c and 338d (FIG. 17) remained biased towards one another to engage the shank of a multiple spindle toolhead or single toolholder therebetween. If, while the tool change arm is horizontally oriented as just described, jaws 338c and 338d are biased apart to release the shank of a single toolholder or multiple spindle toolhead previously engaged by the jaws, then the conduction state of switches 360c and 360d reverses. As will become better understood hereinafter, switches 360a through 360d serve a very important purpose in that switches 360a and 360b indicate the relative clamping state of that pair of tool transfer arm jaws transferring tools to and from the tool change magazine while switches 360c and 360d indicate the relative clamping position of the tool transfer arm jaws which transfer tools to and from the spindle bar.

Figure 19:
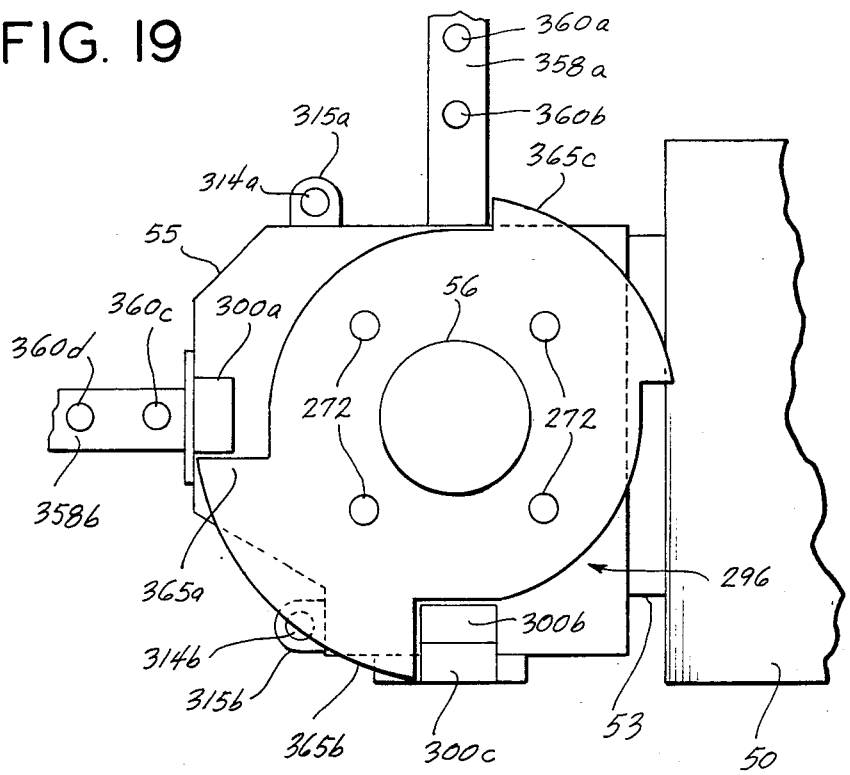
FIG. 19 is a frontal view of the stop plate attached to the rearward end of the tool transfer arm.

Before proceeding to describe the sequence of operations occurring during a tool change cycle, reference should be had to FIG. 19 which is a frontal view of housing 55 with the tool change arm removed to illustrate the configuration of cam plate 296. As illustrated, cam plate 296 is configured with three separate cam lobes 365a, 365b and 365c, respectively. When the tool change arm is vertically oriented as is illustrated in FIG. 18, the cam plate is oriented as shown in FIG. 19 so that cam lobes 365a and 365b are located at approximately 8 o'clock and 7 o'clock, respectively. While cam plate 296 is oriented as illustrated in FIG. 19, cam plate lobe 365c extends approximately between 12 o'clock and 2 o'clock. Cam plate lobe 365c is dimensioned so that during rotation of the tool change arm, the cam plate lobe will abut either of stop members 300a and 300b when the stop members are extended, but the cam plate lobe is of too short a radius to abut fixed stop member 300c. Unlike cam plate lobe 365c, cam plate lobes 365a and 365b are dimensioned to abut fixed stop member 300c as well as movable stop 300a and 300b during tool change arm rotation. During a tool change cycle, which will be described in greater detail immediately hereinafter, stop members 300a and 300b are extended and retracted at predetermined intervals to limit the orbit of the tool change arm so that a tool transfer between the tool storage magazine and the spindle bar can be completed rapidly and efficiently.

Figure 20A:
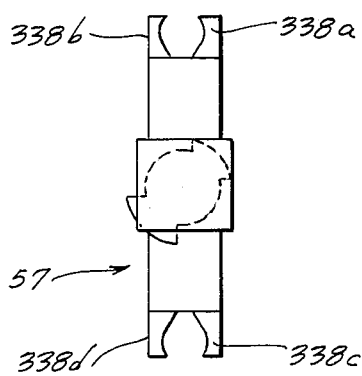

The sequence of steps occurring during a tool change cycle will now be described with reference to FIGS. 20a through 20g, which illustrate, in sequence view, the angular tool change arm orientation during various steps of the tool change cycle. In proceeding to describe a typical tool change cycle, it will be assumed that a designated machining operation has just been completed and that spindle bar 38 (FIGS. 1-3), which now contains the spent tool, has been retracted into spindle 34 (FIGS. 1-3) and spindlehead 28 and upright 22 (FIGS. 1-3) both have been moved to their respective tool change positions. Referring now to FIG. 20a, at the outset of a tool change cycle, tool change arm 57 is vertically oriented so that tool change arm jaws 338a and 338b which are presently empty, that is to say, that no tool is engaged therebetween, lie vertically above tool change arm jaws 338c and 338d which are likewise empty at this time. While the tool change arm is vertically oriented as illustrated in the figure, proximity switch 314b (FIG. 19) is actuated to signify to the machine tool control system that, in fact, the tool change arm is in the vertical orientation previously described. Also, at this time, stop members 300a and 300b, both illustrated in FIG. 19, are retracted and extended, respectively, so as to permit tool change arm 57 to make a 90° arc in the clockwise direction when pivot 56 (FIGS. 13-16) is rotated clockwise by rotary hydraulic actuator 290 (FIG. 16). Counter clockwise rotation of tool change arm 57, however, is prevented due to the abuttment of cam lobe 365b against fixed stop member 300c (FIG. 19).

Once the tool change arm is vertically oriented, as indicated by the actuation of proximity switch 314b (FIGS. 13, 14 and 19), then rotary hydraulic actuator 54 is pressurized to pivot housing 55 thereby rotating the tool change arm about the axis of pivot 53 (FIGS. 13-14) so that the tool change arm becomes parallel to spindle bar 38 (FIG. 1) as illustrated in FIG. 2. After the tool change arm has been tilted so as to be parallel with spindle bar 38, proximity switch 316a (FIG. 13) is actuated by a dog (not shown) fastened to the side of tool change arm carrier 50. Following actuation of proximity switch 316a, the machine tool control system causes tower 46 (FIG. 2) to move along ways 44 (FIG. 2) towards tool storage magazine 60 (FIG. 2) so that tool change arm jaws 338a and 338b (FIGS. 17 and 18) can then engage a toolholder or multiple spindle toolhead that had been indexed to the ready position of the tool storage magazine. Until the tool change tower is positioned along ways 44 (FIG. 2) so that jaws 338a and 338b actually surround the shank of the toolholder or multiple spindle toolheads then at the ready position of the tool storage magazine, the jaws are biased apart from one another so that switch 360b (FIGS. 13 and 14) is actuated while switch 360a (FIGS. 13 and 14) is not. Once the tower has reached its intended destination along ways 44 so that jaws 338a and 338b fully circumscribe the shank of the toolholder or multiple spindle toolhead then at the tool storage magazine ready position, the jaws are biased towards one another to engage the shank of the multiple spindle toolhead or toolholder at the ready position, causing the conduction state of switches 360a and 360b to reverse.

Figure 20B:
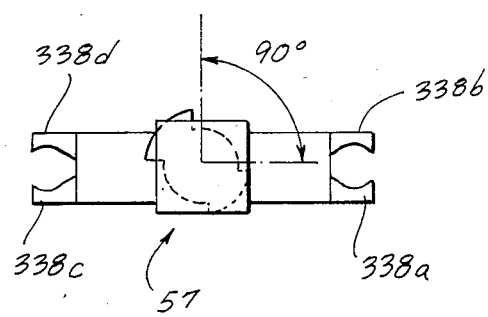

Upon reversal of the conduction state of switches 360a and 360b, the machine tool control system causes tool change arm carrier 50 (FIG. 11) to be displaced upwardly on tower 46 so that the toolholder or multiple spindlehead then engaged by one of the grippers of tool change arm 57 will clear the pocket of tool storage disk 62. After the tool storage magazine is displaced upwardly, tower 46 is displaced forwardly on platform 43 away from the tool storage magazine. When the tool change tower is at its furthest position from the tool storage magazine, pivot 53 (FIG. 19) is rotated to return housing 55 and hence, tool change arm 57 to their vertical position previously illustrated in FIG. 11. Once the tool change arm returns to its vertical position, then proximity switch 316a (FIG. 13) becomes actuated by dog 320 (FIG. 13) while proximity switch 316b becomes deactuated. The actuation of switch 316a causes the machine tool control system to pressurize rotary hydraulic actuator 290 (FIGS. 15 and 16) to rotate tool change arm 57 clockwise about an arm 90° as illustrated in FIG. 20b. The clockwise rotation of tool change arm 57 limited to a 90° arc by virtue of the abuttment of cam plate lobe 365c (FIG. 19) with stop member 300b (FIG. 19) which, as will be recalled, was previously extended at the outset of the tool change cycle.

After the tool change arm is horizontally oriented, as shown in FIG. 20b, such that still empty jaws 338c and 338d are located to the left of jaws 338a and 338b which now engage a fresh toolholder or multiple spindle toolhead therebetween, proximity switch 314a which was previously deactuated now becomes actuated and switch 314b which was previously actuated now becomes deactuated. Following the actuation of proximity switch 314a, the machine tool control system causes platform 43 (FIGS. 2 and 11) to be displaced along ways 40 towards spindlehead 28 (FIG. 2). As platform 43 moves towards spindlehead 28, spindle bar 38 (FIG. 1) is extended out from the spindle so as empty jaw 338c and 338d to engage the spent toolholder or multiple spindle toolhead then engaged in the spindle bar tool receiving socket. Until jaws 338a and 338b actually engage the spent toolholder or multiple spindle toolhead, proximity switch 360c (FIG. 19) remains actuated while switch 360d remains unactuated.

As the toolholder jaws are biased towards one another to engage the spent toolholder therebetween, the conduction state of proximity switches 360c and 360d reverse. Upon the reversal of the conduction state of proximity switches 360c and 360d, the machine tool control system causes the spindle bar to retract into the spindlehead and further causes stop member 300b, which had been extended, to be retracted into housing 55. Once stop member 300b is retracted, as indicated by the change in conduction states of proximity switches 312a and 312b (FIG. 16), tool change arm 57 is further rotated in a clockwise direction about an arc in a 180° until cam lobe 365a (FIG. 19) abuts fixed stop member 300c (FIG. 19). When rotated 180° in a clockwise direction from its previous position, illustrated in FIG. 20b, tool change arm 57 is now oriented as illustrated in FIG. 20c, such that jaws 338a and 338b which now engage the fresh tool, are located to the left of jaws 338c and 338d which engage the previously spent tool. Once tool change arm 57 is oriented, as illustrated in FIG. 20c, respectively, proximity switch 314a, which had been previously actuated, is thus deactuated. Upon deactuation of proximity switch 314a, the machine tool control system causes the spindle bar to be advanced from the spindlehead to engage the new toolholder presently gripped by jaws 338a and 338b. After the spindle bar is fully extended from the spindlehead to receive the toolholder, and draw rod 128 (FIG. 5) is urged rearwardly to clamp the toolholder in the spindle bar, then jaws 338a and 338b are biased apart to release the toolholder previously gripped thereby. As jaws 338a and 338b are urged apart, proximity switch 360c becomes actuated and proximity switch 360d becomes deactuated.

When the conduction state of proximity switches 360c and 360d reverses, the machine tool control system causes platform 43 to move along ways 40 away from the spindlehead while at the same time stop member 300b, now retracted, is extended forwardly. Once the platform reaches its most distal point from spindlehead 28, tool change arm 57 is rotated counter clockwise about a 90° arc as illustrated in FIG. 20d until cam plate lobe 365c (FIG. 19) abuts now-extended stop member 300b (FIGS. 16 and 19). When counter clockwise rotation of the tool change arm is completed, proximity switch 360a becomes actuated by virtue of finger 356b (FIG. 18) being in proximity therewith. Upon actuation of proximity switch 360a, the machine tool control system causes platform 46 to move along ways 44 (FIG. 2) to move the tool change arm towards the tool storage magazine. Following the movement of tower 46 along ways 44, pivot 53 and housing 55 are tilted 90° so as to tilt the tool change arm, thereby allowing the toolholder or multiple spindle presently gripped by jaws 338c and 338d to be returned to the ready position of the tool change magazine. Once pivot 53 and housing 55 have been tilted 90°, so that tool change arm 57 is now parallel to spindle bar 38 (as illustrated in FIG. 2) then the conduction state of proximity switches 316a and 316b reverses. Upon the reversal of the conduction state of proximity switches 316a and 316b, tool change arm carrier 50 is displaced downwardly to place the toolholder or multiple spindle toolhead then engaged by the tool change arm in the tool storage disk pocket indexed to the ready position. Once the tool change arm carrier has been displaced downwardly, jaws 338c and 338d are biased apart to release the toolholder or multiple spindle toolhead gripped thereby causing the conduction state of proximity switches 360a and 360b to reverse.

The reversal of the conduction state of proximity switches 360a and 360b alerts the machine tool control system to displace tower 46 forwardly on platform 43 away from the tool storage magazine. Next, tool storage 60 is indexed to locate the desired tool or multiple spindle toolholder at the ready position. Once indexing of the tool storage magazine is completed, tool change arm 57 transfers the newly indexed tool or multiple spindle toolhead to the spindle as follows. Firstly, tower 46 is displaced rearwardly on platform 43 so that jaws 338c and 338d circumscribe the tool now at the ready position. Thereafter, the jaws are biased together to engage the tool causing the conduction state of switches 360a and 360b to reverse which signals the machine tool control system to displace tool change arm carrier 50 upwardly so that the shank of the toolholder or multiple spindle toolhead then gripped by the tool change arm clears the tool storage magazine pocket.

Following the upward movement of the tool change arm carrier, housing 55 and tool change arm 57 are rotated by rotary hydraulic actuator 54 (FIG. 11) to position the tool change arm perpendicular to the spindle bar as shown in FIG. 11. Once the tool change arm reaches this vertical orientation, the conduction state of proximity switches 314a and 314b reverses.

The change in the conduction state of proximity switches 314a and 314b signals the machine tool control system to extend spindle bar 38 if it is not already extended. Following extension of the spindle bar, the machine tool control system causes rotary hydraulic actuator 290 to rotate pivot 56 and tool change arm 57 in a clockwise direction about an arc of 90° as illustrated in FIG. 20e until cam plate lobe 365a abuts stop members 300b and 300c. When rotation of the tool change arm is completed, proximity switch 360d, which had been deactuated, is now actuated, causing the machine tool control system to displace platform 43 along ways 40 until jaws 338a and 338b circumscribe the tool then in the spindle bar tool receiving socket. Thereafter, the spindle draw bar is urged forwardly to release the toolholder and then jaws 338a and 338b are biased together to engage the toolholder or multiple spindle toolhead then in the spindle bar. Once the jaws are biased together, the conduction state of switches 360c and 360d reverse, signaling the control system to retract the spindle bar and also to retract and advance stop members 300b and 300a, respectively.

Upon the retraction and advancement of stop members 300b and 300a, proximity switches 306b and 312b become actuated, signaling the machine tool control system to cause rotary hydraulic actuator 290 to rotate pivot 56 and tool change arm 57 in a counterclockwise direction about an arc of 180° as illustrated in FIG. 20f so that jaws 338a and 338b are now to the right of jaws 338a and 338b which now overlay the spindle bar. When the rotation of tool change arm is completed, that is to say, when cam plate lobe 365c abuts advanced stop member 300b, proximity switch 314a, which had previously been deactuated, now becomes actuated. This alerts the machine tool control system to extend spindle bar 38 so that the fresh tool engaged by jaws 338a and 338b is received within the spindle bar tool receiving socket enabling the tool to be engaged when draw rod 128 (FIG. 5) is rotatably threaded into the tool to firmly urge it into the tool receiving socket 129.

The seating of the shank 139 of the single toolholder 58 in the socket 129 firmly secures the toolholder to the spindle bar 38. In addition, the bar 38 includes a pair of diametrically opposed keys 131 (one of which is shown in FIGS. 5 and 21) for engaging complementary keyways 135 formed in the toolholder. The keys 131 serve to prevent any turning of the toolholders relative to the spindle bar 38. Moreover (as shown in FIG. 5), the retraction of the spindle bar 38 into the spindle 34 operates to move the back face 366 of the cutter 367 in the single toolholder 58 against the front face 368 of the nose of the spindle 34. The retracting force on the spindle bar 38 is continued to additionally support the cutter and thus virtually eliminate cutter chatter even when large diameter cutters 367 are being operated by the spindle 34.

Once the tool is firmly engaged in the spindle bar, then jaws 338c and 338d are biased apart to release the toolholder causing the conduction state of switches 360c and 360d to reverse. The change in the conduction state of proximity switches 360c and 360d signals the machine tool control system to advance and retract stop members 300b and 300a, respectively. The advancement and retraction of stop members 300b and 300a, respectively, causes proximity switches 306a and 312a to be actuated, signaling the machine tool control system to displace tower 46 away from upright 22. Once tower 46 is displaced from upright 22, actuator 290 rotates tool change arm 57 counter clockwise about a 90° arc as illustrated in FIG. 20g, until cam plate lobe 365b abuts stop members 300b and 300c. By comparing FIGS. 20a and 20g, it can be seen that the tool change arm is now once again positioned to begin a tool change cycle which is completed in exactly the same manner as described above.

As was indicated earlier, when a multiple spindle toolhead, such as multiple spindle toolhead 59 (FIG. 1) is transferred from the tool storage magazine into the spindle by the tool transfer arm, the spindle bar is retracted into the spindlehead to urge the multiple spindle toolhead thereagainst, not only to support the spindlehead, but also to prevent the body of the spindlehead from rotating while the input shank of the multiple spindle toolhead is driven by the spindle bar. The details of how the multiple spindle toolhead engages the spindlehead when urged thereagainst by virtue of the spindle bar being retracted into the spindle are illustrated in Fig. 21. Referring now to that figure, it can be seen that each multiple spindle toolhead, such as multiple spindle toolhead 59, has a plurality of locating pins 370 (only two of which are shown) extending rearwardly from the body of the multiple spindle toolhead in spaced apart relationship about the multiple spindle toolhead input shank 372. A plurality of complementary locating cones 374, corresponding in number to the number of locating pins 370 extending from the body of the multiple spindle toolhead, are spaced about the face of spindle 34 as illustrated in FIG. 1 so that each locating cone seats in a complementary locating pin extending rearwardly from the toolhead body when, following engagement by the spindle bar of a multiple spindle toolhead, the spindle bar is retracted rearwardly into the spindle to urge the multiple spindle toolhead agianst the spindlehead. The locating cone and locating pin arrangement described above, yields a simple, low cost way to assure firm engagement between the spindlehead of a machine tool and the multiple spindle toolhead, thereby eliminating the many disadvantages incurred by prior art fastening schemes.

FIGS. 22 and 23 illustrate the frontal and top or plan views, respectively, of an alternate preferred embodiment 10' of a computer numerically controlled machining center having a bar type spindle. Machining center 10' for the most part, has the same structure and operates in the same fashion as machining center 10 of FIGS. 1–3 and, therefore, like reference numerals are employed in FIGS. 22 and 23 to designate like elements. Machining center 10' of FIGS. 22 and 23 does, however, differ from machining center 10 of FIGS. 1–3 in one very important aspect. Tool storage magazine 60' of machining center 10' of FIGS. 22 and 23, which is configured of a plurality of parallel spaced apart disks 62 which are coaxially mounted to shaft 61 just like tool storage magazine 60 of FIGS. 1–3, differs from tool storage magazine 60 of FIGS. 1–3 in that tool storage magazine 60' of machining center 10' of FIGS. 22 and 23, is removable from machining center 10' so as to facilitate exchange of a complete tool storage magazine, thereby greatly increasing machine tool flexibility.

Tool storage magazine 60' of machine tool 10' illustrated in FIGS. 22 and 23 has its shaft 61 vertically journaled in a base 375 which is slidably mounted on a pair of ways 377 which are fastened on saddle 16 parallel to ways 20 affixed on the saddle. A combined shuttle and index mechanism (not shown) such as are well known in the art, is provided within bed 12 for displacing base 375 along ways 377 so as to shuttle the tool storage magazine onto and off of the saddle. The shuttle and index mechanism is further operative to index the tool storage mechanism to locate a selected one of the tools vertically stored therein in a ready position so as to enable exchange of that tool with the spent tool into the spindle by automatic tool changer 42.

Once the tool storage magazine is spent, it is shuttled by the combined shuttle and index mechanism onto a nearby cart 380 which moves along a track 382 running along the side of the machine tool parallel to ways 14a, 14b and 14c on machine tool bed 12. As is best illustrated in FIG. 23, cart 380 has a pair of tool storage magazine carriers 384a and 384b thereon which are located at opposite ends of the cart. Each of tool storage magazine carriers 384a and 384b is configured of a platform 386 which overlies the cart so that the edge of the platform extends perpendicularly from the cart almost to the saddle 16 of machine tool 10' when cart 380 is moved along track 382 so as to be adjacent to and parallel with bed 12 of the machine tool. Each platform 386 carries a pair of parallel spaced apart ways 388 thereon which are affixed to the platform so as to be perpendicular to track 382. The spacing between ways 388 on platform 386 is identical to the spacing between ways 377 on base 375 so as to permit shuttling of a tool storage magazine between the machine tool and the cart when the cart is positioned along track 382 so as to be adjacent to and parallel with the machine tool. In practice, cart 380 carries but a single tool storage magazine on one of the pair of tool storage magazine carriers on the cart. In this way, the empty tool storage magazine carrier on the cart can receive the spent tool storage magazine when the cart is positioned so that the empty tool storage magazine carrier is aligned with ways 377 on saddle 16. Following shuttling of the spent tool storage magazine onto the then-empty tool storage magazine carrier, the cart is displaced on the track so that the tool storage magazine carrier carrying the fresh tool storage magazine thereon is aligned with ways 377 to permit shuttling of the new tool storage magazine onto the machine tool saddle.

The foregoing describes a computer numerically controlled machine tool whose spindle includes a bar having a tool receiving socket in the forward end thereof for engaging either a multiple spindle toolhead or a single toolholder. The bar is extendable from the spindle for engaging a toolholder from the automatic tool change mechanism and for facilitating a deep boring or drilling operation. The bar is also retractable into the spindle to urge a multiple spindle toolhead against the machine tool to provide firm support therefore.

Although the illustrative embodiments of the invention have been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

What is desired secure by U.S. Letters Patent is:

1. In a tool change mechanism for changing the tools in a cutter supporting spindle of a machine tool; a base; a tool storage magazine mounted on said base and carrying a plurality of tools for use in the spindle; a platform slidably supported by said base for movement in a horizontal path of travel; a tower slidably supported on said platform for movement in a horizontal path perpendicular to the path of travel of said platform so that said tower is movable relative to said base in two mutually perpendicular directions; a carrier slidably supported by said tower for movement in a vertical path; a first pivot journaled in said carrier for pivotal movement; a housing secured to said first pivot for rotation therewith, a second pivot journaled in said housing for rotation about an axis perpendicular to the axis of rotation of said first pivot; a tool change arm secured to said second pivot for rotation therewith; a pair of grips on said tool change arm, each of said grips being operable to retain one of the cutting tools for use in the spindle; platform moving means connected to move said platform in its path of travel for moving said tower and said tool change arm carried thereby between the spindle and said tool storage magazine; tower moving means connected to move said tower and the tool change arm carried thereby toward and away from said magazine; carrier moving means connected to move said carrier in its vertical path of travel along said tower for changing the level of said tool change arm; first pivot actuating means for actuating said pivot to bodily pivot said tool change arm to position it in a horizontal plane for extracting tools from and returning them to said magazine, said pivot also bodily pivoting said tool change arm to position it in a vertical plane for gripping and removing previously used tools from said spindle and presenting new tools from said magazine for use in said spindle; and second pivot actuating means connected to rotate said second pivot for rotating said tool change arm about its axis for exchanging the positions of the tools carried by its grips.

2. A tool change mechanism according to claim 1 wherein said tool storage magazine includes a vertically disposed shaft rotatably supported by said base; a plurality of discs fixed to said shaft for rotation in unison therewith, each of said discs being disposed in a different horizontal plane and being adapted to carry a plurality of tools for use in said spindle.

* * * * *